(12) United States Patent
Iwamoto et al.

(10) Patent No.: US 10,011,154 B2
(45) Date of Patent: Jul. 3, 2018

(54) IN-VEHICLE COOLING DEVICE

(71) Applicant: Mitsubishi Electric Corporation, Chiyoda-ku (JP)

(72) Inventors: Naoki Iwamoto, Chiyoda-ku (JP); Koji Kise, Chiyoda-ku (JP); Toshihiro Noda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 375 days.

(21) Appl. No.: 14/649,458

(22) PCT Filed: Oct. 1, 2013

(86) PCT No.: PCT/JP2013/005849
§ 371 (c)(1),
(2) Date: Jun. 3, 2015

(87) PCT Pub. No.: WO2014/091652
PCT Pub. Date: Jun. 19, 2014

(65) Prior Publication Data
US 2015/0321534 A1    Nov. 12, 2015

(30) Foreign Application Priority Data

Dec. 11, 2012  (JP) .................................. 2012-270537

(51) Int. Cl.
*B60H 1/00* (2006.01)
*F28D 1/06* (2006.01)
(Continued)

(52) U.S. Cl.
CPC ......... *B60H 1/00328* (2013.01); *B61C 17/00* (2013.01); *F28D 1/0475* (2013.01);
(Continued)

(58) Field of Classification Search
CPC .......... H01F 27/10; H01F 27/12; F28D 7/005; F28D 7/0058; F28D 1/0426; F28D 1/0475; B60H 1/00328
(Continued)

(56) References Cited

U.S. PATENT DOCUMENTS 4,050,881 A * 9/1977 Watson, Jr. .......... B23K 1/0012
165/150
4,520,867 A * 6/1985 Sacca .................... F28D 1/0475
165/144
(Continued)

FOREIGN PATENT DOCUMENTS

DE    102010040281    * 3/2012 .............. F22B 1/025
JP    10 317959        12/1998
(Continued)

OTHER PUBLICATIONS

US PG Pub. 2012/013427A1 used as translation of WO2010150345A1.*
(Continued)

*Primary Examiner* — Len Tran
*Assistant Examiner* — Paul Alvare
(74) *Attorney, Agent, or Firm* — Oblon, McClelland, Maier & Neustadt, L.L.P.

(57) ABSTRACT

An in-vehicle cooling device includes: a header to be mounted so as to be adjacent to a side surface of a transformer mounted on a back side of a bottom portion of a vehicle, the header having a vertical surface along a traveling direction and a direction orthogonal to the travelling direction; a vertical-direction installed cooling pipe having both ends fixed to the header and being installed on a vertical plane orthogonal to the traveling direction; and a traveling-direction installed cooling pipe having both ends fixed to the header and being installed on a travel plane that is parallel
(Continued)

to a horizontal plane, the vertical-direction installed cooling pipe and the traveling-direction installed cooling pipe being installed to overlap with each other in a direction orthogonal to the header.

9 Claims, 11 Drawing Sheets

(51) Int. Cl.
  F28F 9/26 (2006.01)
  F28F 9/02 (2006.01)
  F28D 7/06 (2006.01)
  H01F 27/12 (2006.01)
  B61C 17/00 (2006.01)
  F28D 1/047 (2006.01)
  F28D 7/00 (2006.01)
  F28D 21/00 (2006.01)

(52) U.S. Cl.
  CPC ............ H01F 27/12 (2013.01); F28D 7/005 (2013.01); F28D 7/0058 (2013.01); F28D 2021/0031 (2013.01)

(58) Field of Classification Search
  USPC ...... 165/73, 74, 144, 148, 174, 176, 910, 41
  See application file for complete search history.

(56) References Cited

U.S. PATENT DOCUMENTS 4,549,605 A * 10/1985 Sacca .................... F28F 9/0217
                                                165/150
7,760,060 B2 * 7/2010 Kiuchi .................. H01F 27/322
                                                336/131
2012/0013427 A1 * 1/2012 Noda ...................... B61C 17/00
                                                336/57
2012/0050993 A1 3/2012 Suzuki et al.
2013/0240177 A1 * 9/2013 Howard .................... F28F 1/00
                                                165/104.11

FOREIGN PATENT DOCUMENTS

| JP | 11 189153 | 7/1999 | |
|---|---|---|---|
| JP | 2000 134701 | 5/2000 | |
| JP | 2001 260877 | 9/2001 | |
| JP | 2003 274671 | 9/2003 | |
| JP | WO 2010150345 A1 * | 12/2010 | ............ B61C 17/00 |
| JP | 2011 259536 | 12/2011 | |
| JP | 2012 54316 | 3/2012 | |
| WO | 2010 150345 | 12/2010 | |

OTHER PUBLICATIONS

Translation of DE 102010040281 A1 entitled Translation—DE 102010040281 A1.*

Extended European Search Report dated Jul. 20, 2016 Application No. 13861907.7.

International Search Report dated Nov. 12, 2013 in PCT/JP2013/005849 Filed Oct. 1, 2013.

Office Action dated Jan. 26, 2016 in Japanese Patent Application No. 2014-551837 with English translation.

* cited by examiner

FIG. 1
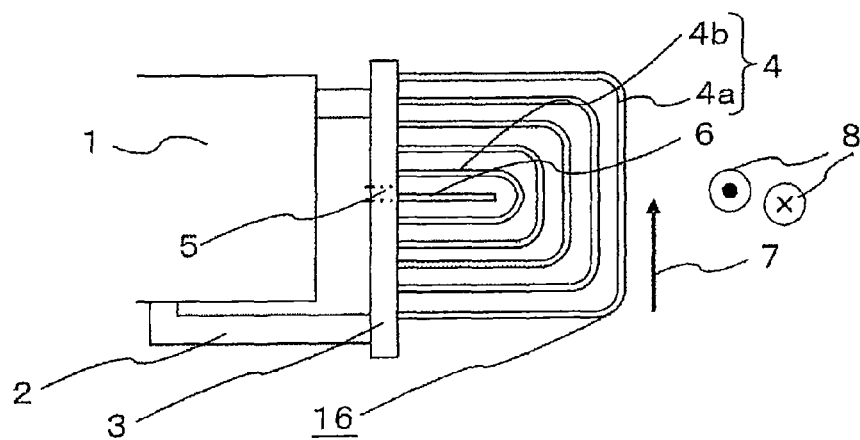
FIG. 2A
FIG. 2B
FIG. 3
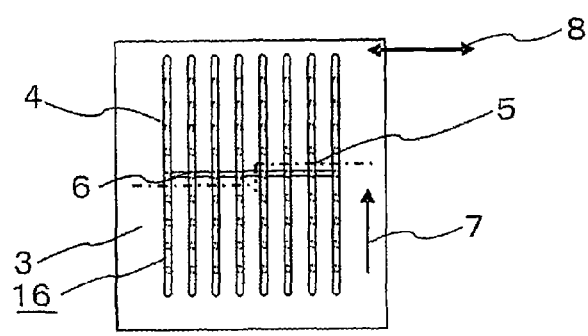

IN-VEHICLE COOLING DEVICE

TECHNICAL FIELD

The present invention relates to an in-vehicle cooling device configured to carry out cooling through heat transfer of a traveling air flow, which is generated when a railroad vehicle is traveling, and a rising air flow, which is generated when the vehicle is stopped.

BACKGROUND ART

A related-art in-vehicle cooling device is configured to cool, with use of a traveling air flow, electrical equipment such as a transformer and a reactor mounted on a vehicle. The transformer is installed at a lower portion of the vehicle, and the cooling device is mounted horizontally adjacent to the transformer.

The in-vehicle cooling device includes cooling pipes through which a cooling medium flows, and a header for fixing the cooling pipes, the header having a flow path of the cooling medium, the flow path being formed therein. Each of the cooling pipes is curved into a U-shape or a rectangular U-shape, and both ends thereof are fixed to the header. A plurality of cooling pipes are installed on the same plane that is orthogonal to the traveling direction, to thereby form a cooling pipe group. A plurality of cooling pipe groups are further arranged to overlap with each other in the traveling direction. The cooling pipe groups and a communication passage are mounted on the header by welding and the like. The header has mounting positions for mounting the cooling pipes at even intervals in each of a lateral direction and a vertical direction.

The cooling medium is fed from a vehicle transformer main body through a pipe to enter the communication passage, and passes from the header through the cooling pipe group to flow into the header again. Then, the cooling medium passes from the header through the communication passage to return to the vehicle transformer main body again. When the cooling medium flows through the cooling pipe group, due to the heat transfer in the natural convection at the outer surface of the cooling pipe group and in the forced convection caused when the traveling air flow passes along the surface of the cooling pipe group, heat of the cooling medium is exchanged with the outside air, and thus the cooling medium is cooled. In this case, in order to promote the cooling effect by the forced convection heat transfer, the cooling device has been installed on the vehicle side portion at which the traveling airflow rate is large. When such a railroad vehicle travels, a traveling air flow blows in a direction opposite to the vehicle traveling direction in the vicinity of the reactor. This traveling air flow removes the generated heat to cool the winding.

CITATION LIST

Patent Literature

Patent Literature 1: Japanese Unexamined Patent Application Publication No. Hei 11-189153 (line 37 of page 2 to line 40 of page 2)

SUMMARY OF INVENTION

Technical Problems

The related-art cooling pipe group of the cooling device to be mounted on the railroad vehicle is shaped in consideration only of the air flow during travel. However, it is known that, in a case where the vehicle power supply system is activated while the vehicle is stopped, heat generated from the transformer positioned in the vicinity of the cooling pipe group flows as a rising air flow from the lower part to the upper part of the cooling pipe group.

Therefore, in the related-art cooling device that uses the traveling air flow, the cooling pipe group is installed only on a vertical plane adapting to the traveling air flow during travel, and no consideration is given on the rising air flow to be generated when the vehicle is stopped.

Further, in order to increase the heat exchange amount of the cooling device, it is necessary to increase the surface area of the cooling pipe group. However, in order to increase the number of cooling pipes, the installing region of the cooling pipe group is required to be increased, which has been a problem.

The present invention has been made to overcome the above-mentioned problems, and has an object to increase the heat exchange amount of the cooling device to enable efficient cooling by arranging the cooling pipes so as to adapt to the directions of the air flows during both travel and stop, without increasing the installing region of the cooling pipe group.

Solution to Problems

According to one embodiment of the present invention, there is provided an in-vehicle cooling device, including: a header to be mounted so as to be adjacent to a side surface of a transformer mounted on a back side of a bottom portion of a vehicle, the header having a surface extending along a traveling direction and a direction orthogonal to the travelling direction; a vertical-direction installed cooling pipe having both ends fixed to the header and being installed on a vertical plane orthogonal to the traveling direction; and a traveling-direction installed cooling pipe having both ends fixed to the header and being installed on a travel plane that is parallel to a horizontal plane, the vertical-direction installed cooling pipe and the traveling-direction installed cooling pipe being installed to overlap with each other in a direction orthogonal to the header.

Advantageous Effects of Invention

According to the in-vehicle cooling device of the one embodiment of the present invention, the cooling pipes are installed in combination in the vertical direction and in the traveling direction. Thus, the surface area of the cooling pipe group can be increased without increasing the installing region of the cooling pipe group. Therefore, there is produced an effect in that the heat exchange amount is increased during travel and stop of a train, and thus efficient cooling is possible.

BRIEF DESCRIPTION OF DRAWINGS

FIG. 1 is a projection view of a cooling device from a vehicle front direction according to Embodiment 1 of the present invention.

FIGS. 2A and 2B are views of a cooling pipe of the cooling device from a front direction according to Embodiment 1 of the present invention.

FIG. 3 is a projection view of the cooling device from a vehicle side direction according to Embodiment 1 of the present invention.

DESCRIPTION OF EMBODIMENTS

Embodiment 1

Figure 4:
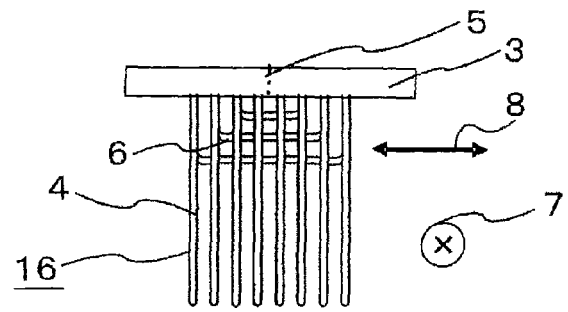
FIG. 4 is a projection view of the cooling device from a vehicle top direction according to Embodiment 1 of the present invention.

FIG. 1 is a projection view of a cooling device from a vehicle front direction according to Embodiment 1 of the present invention. FIGS. 2A and 2B are views of a cooling pipe 14 to be installed on the cooling device from a front direction according to Embodiment 1 of the present invention. In FIG. 1, an air flow direction 8 during travel is a direction from the front side to the deep side of the drawing sheet or an opposite direction thereto, and an air flow direction 7 during stop is a direction from the lower side to the upper side of the drawing sheet, that is, a vertical direction. A train vehicle may travel bi-directionally, and hence the air flow direction 8 during travel may be bidirectional, which is also true in other embodiments. A travel plane herein refers to a plane parallel to the ground, that is, a horizontal plane.

The cooling device of the present invention includes a header 3, vertical-direction installed cooling pipes 4, and traveling-direction installed cooling pipes 6. The header 3 is mounted to a transformer 1 through intermediation of communication passages 2, and a plurality of cooling pipes 14 are fixed to the header 3. In Embodiments 1 to 6 of the present invention, the cooling pipe 14 installed in the vertical direction is referred to as the vertical-direction installed cooling pipe 4, and the cooling pipe 14 installed on a plane parallel to the ground is referred to as the traveling-direction installed cooling pipe 6. A cooling pipe group 16 includes the plurality of cooling pipes 14 including the vertical-direction installed cooling pipes 4 and the traveling-direction installed cooling pipes 6.

The cooling device of the present invention is designed by increasing and decreasing the number of rows for installing the vertical-direction installed cooling pipes 4 based on the heat exchange amount required in the cooling device. In Embodiment 1, as an example, description is made of a case of applying the present invention to, a cooling device as a reference, in which sets of five vertical-direction installed cooling pipes 4 installed in the vertical direction are installed in eight rows in the traveling direction, and as described later with reference to FIG. 4, three traveling-direction installed cooling pipes 6 are installed in the traveling direction.

Further, the traveling-direction installed cooling pipe 6 is a cooling pipe 14 installed on the travel plane. The travel plane on which the traveling-direction installed cooling pipe 6 is installed is orthogonal to a vertical plane on which the vertical-direction installed cooling pipes 4 are installed. Among the vertical-direction installed cooling pipes 4, an outer-peripheral vertical-direction installed cooling pipe 4a is the vertical-direction installed cooling pipe 4 positioned on the outermost side on the same vertical plane, and an inner-peripheral vertical-direction installed cooling pipe 4b is the vertical-direction installed cooling pipe 4 positioned on the innermost side on the same vertical plane.

The traveling-direction installed cooling pipes 6 are installed on the inner side with respect to, among the vertical-direction installed cooling pipes 4 present on the same vertical plane, the vertical-direction installed cooling pipe 4 having the shortest total length. The vertical-direction installed cooling pipes 4 and the traveling-direction installed cooling pipes 6 are installed to overlap with each other so as to be orthogonal to the header 3. Note that, a cooling pipe 14 installed on an inner side herein refers to a cooling pipe having a bent part 14a positioned closer to the header 3 than that of another one of the cooling pipes 14.

Inside the transformer 1, there is mounted a pipe (not shown) for feeding a cooling medium such as oil to the upper-side communication passage 2 and receiving the cooling medium from the lower-side communication passage 2, to thereby circulate the cooling medium inside the transformer 1. Further, although not shown, inside the transformer 1, a pump for delivering the cooling medium to the communication passage 2 is mounted. The header 3 has a partition 5 formed therein, which forms a flow path of the cooling medium.

The cooling pipe 14 of FIGS. 2A and 2B includes the bent part 14a and a linear part 14b fixed to the header 3. Further, some of the cooling pipes 14 include a linear part 14c parallel to the header 3. The cooling pipe 14 is made of a metal such as iron, and has an outer diameter of 16 mm, for example. The cooling pipe 14 includes the bent part 14a curved into a U-shape or a rectangular U-shape so that both ends of the cooling pipe 14 are fixed to the header. In order to maintain the strength of the cooling pipe 14, the distance between the two linear parts 14b of the cooling pipe 14 is required to be about five times as large as the outer diameter of the cooling pipe 14. The bent part 14a of the cooling pipe 14 has a limit, and hence a space of at least about 80 mm is formed at the center portion of the inner-peripheral vertical-direction installed cooling pipe 4b of the cooling pipe group 16. The space generated between the linear parts 14b due to the limit of the bent part 14a of the cooling pipe 14 is referred to as an empty space. Note that, the bending limit of the bent part 14a is formed under balance with the strength, and the cooling pipe 14 is not necessarily bent to the limit of the bending curvature of the cooling pipe 14.

In the cooling pipe 14 of FIG. 2A, an interval between the two linear parts 14b is wide because the linear part 14c is arranged para to the header 3, and one or more cooling pipes 14 can be installed on the inner side in a nested manner on the same plane. FIG. 2B is a view illustrating the cooling pipe 14 installed on the inner peripheral side, and the bent part 14a is formed with a bending limit curvature. In the cooling pipe 14 of FIG. 2B, the interval between the two linear parts 14b fixed to the header 3 is narrow. Thus, the cooling pipe 14 cannot be installed on the inner side in a nested manner on the same plane, but there is an empty space in which an orthogonal cooling pipe 14 can be installed. FIGS. 2A and 2B illustrate a center line 15 for convenience between the linear parts 14b fixed to the header 3. The shape of the cooling pipe 14 is symmetric with respect to the center line 15 as illustrated in FIGS. 2A and 2B.

A space of about 80 mm is formed at an installing position of the inner-peripheral vertical-direction installed cooling pipe 4b (between two linear parts). In the case of the above-mentioned cooling pipe 14 having an outer diameter dimension of 16 mm, an interval of about 80 mm is required to be formed to maintain the strength. At least one traveling-direction installed cooling pipe 6 is installed in the empty space of this inner-peripheral vertical-direction installed cooling pipe 4b.

Subsequently, with reference to FIG. 1, the flow path of the cooling medium flowing through the vertical-direction installed cooling pipes 4 is described. The cooling medium fed from the transformer 1 through the pipe (not shown) enters the communication passage 2. The cooling medium flows from the communication passage 2 on the upper-half side to a part of the header 3 on the upper-half side, and the cooling medium in the part of the header 3 on the upper-half side flows in a dispersed manner through the plurality of vertical-direction installed cooling pipes 4 on the upper-half side. The partition 5 is installed between the upper-half side of the header 3 and the lower-half side of the header 3, and hence the cooling medium that has entered the vertical-direction installed cooling pipes 4 on the upper-half side always flows through the vertical-direction installed cooling pipes 4 on the lower-half side. The cooling medium in the plurality of vertical-direction installed cooling pipes 4 on the upper-half side flows into a part of the header 3 on the lower-half side through the plurality of vertical-direction installed cooling pipes 4 on the lower-half side. The cooling medium flows from the part of the header 3 on the lower-half side to the communication passage 2 on the lower-half side to return inside the transformer 1.

FIG. 3 is a projection view of the cooling device from the vehicle side surface direction according to Embodiment 1 of the present invention. As illustrated in FIG. 3, on the header 3, the vertical-direction installed cooling pipes 4 are installed in the vertical direction, and the traveling-direction installed cooling pipes 6 are installed in the horizontal direction. Further, the air flow direction 7 during stop is the direction from the lower side to the upper side, that is, the vertical direction, and the air flow direction 8 during travel is the horizontal direction. In FIG. 3, the air flow passes through the cooling pipe group 16 as in the air flow direction 7 during stop and the air flow direction 8 during travel. In the following embodiments, an installed cooling pipe region refers to a volume in which the cooling pipe group 16 is installed.

The cooling pipes 14 are installed on the travel plane or the vertical plane, and the cooling pipes 14 are all arranged on the header 3 so as to be symmetric with respect to the center line 15. When the shape of the cooling pipe 14 is not symmetric with respect to the center line 15, the balance is lowered, which may easily cause loosening due to the vibration of the vehicle. Thus, it is desired that the shape of the cooling pipe 14 be symmetric.

Subsequently, with reference to FIGS. 1 and 3, the direction in which the air flow moves is described. When the vehicle is stopped, not the outside air flow in the horizontal direction but the rising air flow generated from the transformer 1 has a large influence. The rising air flow is warm air, and hence is light and rises from the lower side to the upper side. Therefore, when the vehicle is stopped, the rising air flow generated from the transformer 1 rises in the direction 7 from the lower side to the upper side of the vertical-direction installed cooling pipe 4.

When the vehicle is traveling, an air flow moves in the air flow direction 8 during travel, which is opposite to the traveling direction. Further, the rising air flow moves also during travel similarly to that during stop. The general flow rate of the air flow in the traveling direction during the travel of the vehicle is 10 m/s or more, and the flow rate of the air flow during stop is 0.25 to 0.5 m/s. The air flow in the traveling direction has an airflow rate that is 20 times or more as large as that of the air flow in the vertical direction, and hence the rising air flow is not considered during travel.

FIG. 4 is a projection view of the cooling device from the vehicle top direction according to Embodiment 1 of the present invention. In FIG. 4, the air flow direction 7 during stop is a direction from the deep side to the front side of the drawing sheet, and the air flow direction 8 during travel is the horizontal direction. As illustrated in FIG. 4, on the header 3, the vertical-direction installed cooling pipes 4 are installed in the vertical direction, and the traveling-direction installed cooling pipes 6 are installed in the horizontal direction.

Subsequently, with reference to FIGS. 1, 3, and 4, the vertical-direction installed cooling pipes 4 and the traveling-direction installed cooling pipes 6, which constitute the cooling pipe group 16 of Embodiment 1, are described. As illustrated in FIGS. 1 and 3, five vertical-direction installed cooling pipes 4 are present on the same vertical plane. The five vertical-direction installed cooling pipes 4 are different from each other in terms of an interval between the linear parts 14*b*. The five vertical-direction installed cooling pipes 4 form a nested-shape structure in which a cooling pipe with a small interval is sequentially arranged at an interval on the inner side of a cooling pipe with a large interval. That is, on the same vertical plane, the five vertical-direction installed cooling pipes 4 are arranged in a nested shape in the order from a cooling pipe with a large total length to a cooling pipe with a small total length toward the inner side. Sets of the five vertical-direction installed cooling pipes 4 are installed in eight rows in the horizontal direction. A space between the header 3 and the vertical-direction installed cooling pipe 4 having the shortest total length among the vertical-direction installed cooling pipes 4 present on the same vertical plane corresponds to the above-mentioned empty space. The traveling-direction installed cooling pipes 6 are installed in this empty space.

Further, in the cooling pipe group 16, as illustrated in FIG. 4, in order to improve the cooling efficiency of the cooling device, three traveling-direction installed cooling pipes 6 are installed on the inner side of the vertical-direction installed cooling pipe 4 having the shortest total length among the vertical-direction installed cooling pipes 4. Those three traveling-direction installed cooling pipes 6 respectively have different total lengths, and as illustrated in FIGS. 1 and 3, the traveling-direction installed cooling pipes 6 form a nested-shape structure and are installed on the same travel plane. Therefore, in total, three traveling-direction installed cooling pipes 6 and forty vertical-direction installed cooling pipes 4 are installed.

Figure 5:
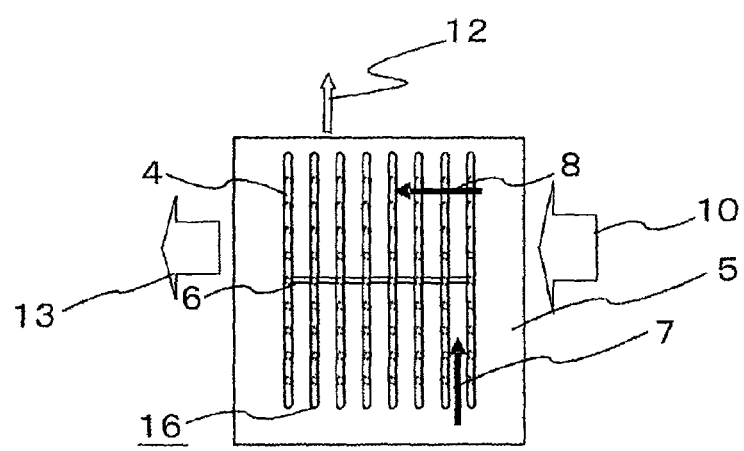
FIG. 5 is a projection view of the cooling device from the vehicle side direction according to Embodiment 1 of the present invention, which also illustrates air flows that flow when the vehicle is stopped.

The principle of heat exchange that occurs by the air flow in the present invention is described. FIG. 5 is a projection view of the cooling device from the vehicle side direction according to Embodiment 1 of the present invention, which also illustrates air flows that flow during travel. The position of the cooling pipe group 16 and the direction of the air flow of FIG. 5 are the same as those of FIG. 3. FIG. 5 further illustrates an air inflow rate 10, an air outflow rate 12, and an airflow rate 13 reaching the downstream side. When the vehicle is traveling, an air flow with the air inflow rate 10 flows through the cooling device to reach the downstream side with the airflow rate 13, but an air flow of part of the air inflow rate 10 flows out in the middle as the air outflow rate 12 in a direction perpendicular to the traveling direction. The heat exchange occurs when the low-temperature outside air flow is brought into contact with the high-temperature cooling pipe group 16. The heat exchange amount increases as the surface area of the cooling pipe group 16 increases.

The cooling device of FIG. 5 includes the traveling-direction installed cooling pipes 6, and hence the surface area of the cooling pipe group 16 is larger than that of the cooling device including only the vertical-direction installed cooling pipes 4. Therefore, the heat exchange amount during travel is larger than that of the cooling device including only the vertical-direction installed cooling pipes 4.

In the cooling device of FIG. 5, an air flow moves in the horizontal direction during travel. When the air flow moves through the cooling pipe group 16, because the traveling-direction installed cooling pipes 6 are installed, as compared to a case where the traveling-direction installed cooling pipe 6 is absent, the air outflow rate 12 that flows out in the orthogonal direction due to the warm air flowing in the direction perpendicular to the traveling direction decreases, and the airflow rate 13 reaching the downstream side increases. This is because the outflow of the air flow in the internal space between the vertical-direction installed cooling pipes 4 in the direction orthogonal to the traveling direction is blocked by the traveling-direction installed cooling pipes 6. Therefore, when the vehicle is traveling, the loss of the air outflow rate from the inside of the installed cooling pipe region toward the outside in the direction perpendicular to the vehicle front direction decreases as compared to the case where the cooling pipe group 16 includes only the vertical-direction installed cooling pipes 4.

It is desirable the vertical-direction installed cooling pipe 4 and the traveling-direction installed cooling pipe 6 each include the linear part 14*b* fixed to the header 3 or the linear part 14*c* parallel to the header 3. This is because, in the cooling pipes 14 having the same total length and total width, the surface area is larger in a cooling pipe having a shape closer to a rectangle with a linear part than in a cooling pipe having a shape with many curved parts, and thus the heat exchange amount can be further increased.

With the configuration of the cooling device according to Embodiment 1 of the present invention, the traveling-direction installed cooling pipes 6 are installed in the empty space formed at the installing position of the vertical-direction installed cooling pipes 4. Therefore, the cooling pipe group 16 has a larger surface area as compared to a case where only the vertical-direction installed cooling pipes 4 are installed. Thus, there is produced an effect in that, without increasing the volume of the installed cooling pipe region, the amount of heat exchange from the cooling pipe group 16 can be increased.

Further, the cooling device includes the traveling-direction installed cooling pipes 6 arranged in the same direction as the air flow direction during travel. Thus, it is possible to suppress the outflow of the traveling-direction air flow, which has flowed into the installed cooling pipe region, toward the outer side in the direction perpendicular to the traveling-direction air flow. Therefore, the airflow rate flowing in the vehicle front direction increases, and thus there is produced an effect in that, without increasing the volume of the installed cooling pipe region, the amount of heat exchange from the cooling pipe group 16 can be increased.

Further, the traveling-direction installed cooling pipes 6 illustrated in FIG. 1 may be formed further on the outer side of the outer-peripheral vertical-direction installed cooling pipe 4a. The cooling pipe 14 positioned on the outermost side contributes to the air outflow rate 12 in the direction perpendicular to the traveling direction. Therefore, when the traveling-direction installed cooling pipes 6 are each formed as the outermost cooling pipe in the cooling pipe group 16, the heat exchange amount during travel can be further increased.

Embodiment 2

Figure 6:
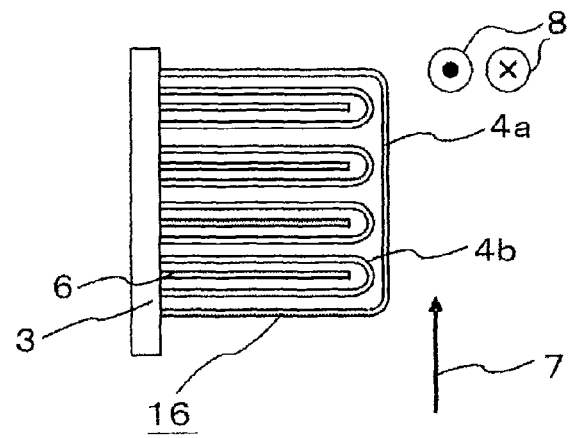
FIG. 6 is a projection view of a cooling device from the vehicle front direction according to Embodiment 2 of the present invention.

Members in Embodiment 2 are similar to those in Embodiment 1, but Embodiment 2 differs from Embodiment 1 in the arrangement and shapes of the vertical-direction installed cooling pipes 4 and the traveling-direction installed cooling pipes 6. FIG. 6 is a projection view of a cooling device from the vehicle front direction according to Embodiment 2 of the present invention.

In FIG. 6, the air flow direction 8 during travel is the direction from the front side to the deep side of the drawing sheet or the opposite direction thereto, and the air flow direction 7 during stop is the direction from the lower side to the upper side, that is, the vertical direction. In this embodiment, as illustrated in FIG. 6, the outer-peripheral vertical-direction installed cooling pipe 4a is installed, the inner-peripheral vertical-direction installed cooling pipes 4b are installed on the inner side thereof, and the traveling-direction installed cooling pipes 6 are mounted further on the inner side thereof.

Figure 7:
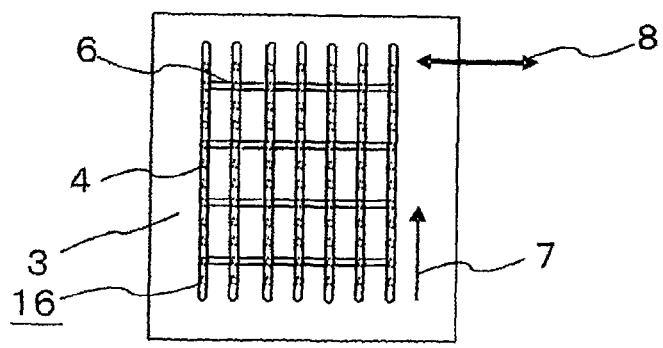
FIG. 7 is a projection view of the cooling device from the vehicle side direction according to Embodiment 2 of the present invention.

FIG. 7 is a projection view of the cooling device from the vehicle side direction according to Embodiment 2 of the present invention. In FIG. 7, the air flow direction 7 during stop is the direction from the lower side to the upper side, that is, the vertical direction, and the air flow direction 8 during travel is the horizontal direction. As illustrated in FIG. 7, on the header 3, the vertical-direction installed cooling pipes 4 are installed in the vertical direction, and the traveling-direction installed cooling pipes 6 are installed in the horizontal direction.

Figure 8:
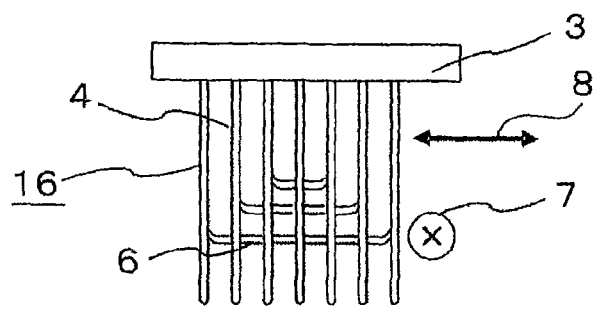
FIG. 8 is a projection view of the cooling device from the vehicle top direction according to Embodiment 2 of the present invention.

FIG. 8 is a projection view of the cooling device from the vehicle top direction according to Embodiment 2 of the present invention. As illustrated in FIG. 8, on the header 3, the vertical-direction installed cooling pipes 4 are installed in the vertical direction, and the traveling-direction installed cooling pipes 6 are installed in the horizontal direction. In FIG. 8, the air flow direction 7 during stop is a direction from the deep side to the front side of the drawing sheet, and the air flow direction 8 during travel is the horizontal direction.

Subsequently, with reference to FIGS. 6 to 8, the configurations of the vertical-direction installed cooling pipes 4 and the traveling-direction installed cooling pipes 6, which construct the cooling pipe group 16 of Embodiment 2, are described. The traveling-direction installed cooling pipe 6 is installed in the empty space positioned further on the inner side of the inner-peripheral vertical-direction installed cooling pipe 4b. Four traveling-direction installed cooling pipes 6 are installed in the similar arrangement in the vertical direction. Further, as illustrated in FIGS. 6 and 7, the outer-peripheral vertical-direction installed cooling pipe 4a and four inner-peripheral vertical-direction installed cooling pipes 4b are arranged on the same vertical plane, and sets of the outer-peripheral vertical-direction installed cooling pipe 4a and the four inner-peripheral vertical-direction installed cooling pipes 4b are installed in seven rows in the traveling direction. Further, in order to increase the cooling efficiency of the cooling device, three traveling-direction installed cooling pipes 6 are installed on the same travel plane in the empty space of the vertical-direction installed cooling pipe 4b. Then, sets of the three traveling-direction installed cooling pipes 9 on the same travel plane are arranged in four rows in the vertical direction. Therefore, in total, thirty-five vertical-direction installed cooling pipes 4 and twelve traveling-direction installed cooling pipes 6 are installed.

With the configuration of the cooling device according to Embodiment 2 of the present invention, in this embodiment, the cooling device includes the traveling-direction installed cooling pipes 6, and thus has a larger surface area than that in the case where only the vertical-direction installed cooling pipes 4 are installed. Thus, there is produced an effect in that, without increasing the volume of the installed cooling pipe region, the amount of heat exchange from the cooling pipe group 16 can be increased.

Further, the cooling device includes the traveling-direction installed cooling pipes 6 arranged in the same direction as the air flow direction during travel. Thus, it is possible to suppress the outflow of the air flow, which has flowed into the installed cooling pipe region, toward the outer side in the direction perpendicular to the traveling direction of the air flow, thereby increasing the airflow rate flowing in the vehicle front direction. Therefore, the airflow rate flowing in the vehicle front direction increases, and thus there is produced an effect in that, without increasing the volume of the installed cooling pipe region, the amount of the heat exchange from the cooling pipe group 16 can be increased.

Further, the shape and the dimension of the cooling pipes 14 are unified into five types, that is, three types of the traveling-direction installed cooling pipe 6, the outer-peripheral vertical-direction installed cooling pipe 4a, and the inner-peripheral vertical-direction installed cooling pipe 4b. Therefore, the number of types of the shape of the cooling pipes 14 is reduced, which can improve the productivity.

Further, in this embodiment, a single traveling-direction installed cooling pipe 6 may be arranged on the same travel plane instead of arranging a plurality of traveling-direction installed cooling pipes 6 having different shapes, and the cooling device may include the cooling pipes 14 of only two types, that is, the outer-peripheral vertical-direction installed cooling pipe 4a and one type of the traveling-direction installed cooling pipe 6. With such a configuration, the cooling pipes 14 are unified into two types, that is, the outer-peripheral vertical-direction installed cooling pipe 4a and the one type of the traveling-direction installed cooling pipe 6. Therefore, the number of types of the shape of the cooling pipes 14 is further reduced, which can improve the productivity.

Embodiment 3

Figure 9:
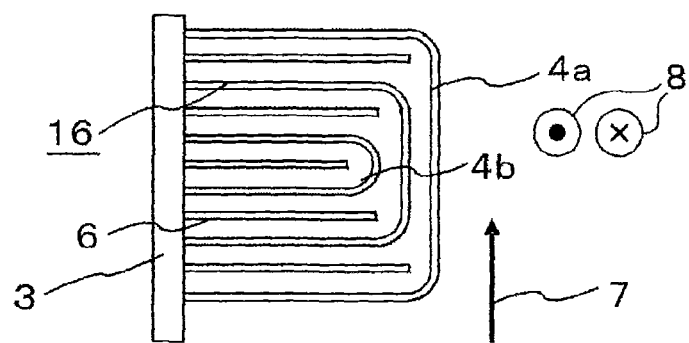
FIG. 9 is a projection view of a cooling device from the vehicle front direction according to Embodiment 3 of the present invention.

Members in Embodiment 3 are similar to those in Embodiment 1, but Embodiment 3 differs from Embodiment 1 in the arrangement and shapes of the vertical-direction installed cooling pipes 4 and the traveling-direction installed cooling pipes 6. FIG. 9 is a projection view of a cooling device from the vehicle front direction according to Embodiment 3 of the present invention. In Embodiment 3, as illustrated in FIG. 9, the outer-peripheral vertical-direction installed cooling pipe 4a is installed, and the traveling-direction installed cooling pipes 6 and the vertical-direction installed cooling pipes 4 are alternately installed on the inner side thereof. Further, the inner-peripheral vertical-direction installed cooling pipe 4b is installed on the innermost side of the vertical-direction installed cooling pipes 4.

Figure 10:
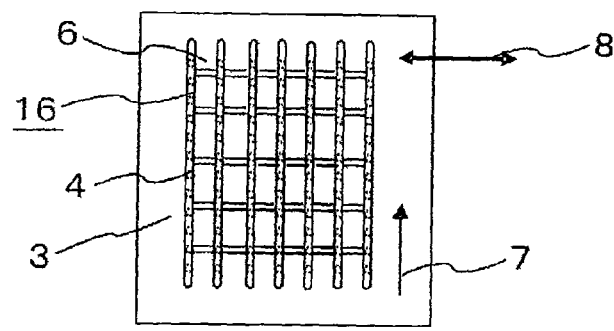
FIG. 10 is a projection view of the cooling device from the vehicle side direction according to Embodiment 3 of the present invention.

In FIG. 9, the air flow direction 8 during travel is the direction from the front side to the deep side of the drawing sheet or the opposite direction thereto, and the air flow direction 7 during stop is the direction from the lower side to the upper side, that is, the vertical direction. FIG. 10 is a projection view of the cooling device from the vehicle side direction according to Embodiment 3 of the present invention. In FIG. 10, the air flow direction 7 during stop is the direction from the lower side to the upper side, that is, the vertical direction, and the air flow direction 8 during travel is the horizontal direction. As illustrated in FIG. 10, on the header 3, the vertical-direction installed cooling pipes 4 are installed in the vertical direction, and the traveling-direction installed cooling pipes 6 are installed in the horizontal direction.

Figure 11:
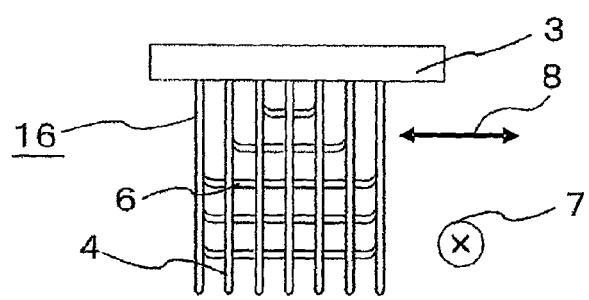
FIG. 11 is a projection view of the cooling device from the vehicle top direction according to Embodiment 3 of the present invention.

FIG. 11 is a projection view of the cooling device from the vehicle top direction according to Embodiment 3 of the present invention. In FIG. 11, the air flow direction 7 during stop is the direction from the deep side to the front side of the drawing sheet, and the air flow direction 8 during travel is the horizontal direction. As illustrated in FIG. 11, on the header 3, the vertical-direction installed cooling pipes 4 are installed in the vertical direction, and the traveling-direction installed cooling pipes 6 are installed in the horizontal direction. Further, in order to increase the cooling efficiency of the cooling device, the vertical-direction installed cooling pipes 4 and the traveling-direction installed cooling pipes 6 are installed to overlap with each other in a direction orthogonal to the header 3.

Subsequently, with reference to FIGS. 9 to 11, the configurations of the vertical-direction installed cooling pipes 4 and the traveling-direction installed cooling pipes 6, which construct the cooling pipe group 16 of Embodiment 3, are described. In Embodiment 3, the vertical-direction installed cooling pipes 4 are installed on the same vertical plane in a nested shape in which the plurality of the vertical-direction installed cooling pipes 4 are arranged in a nested shape in which each of the plurality of the vertical-direction cooling pipes 4 has a length larger than a length of another one, disposed on a more inner side, of the vertical-direction installed cooling pipes. Further, the traveling-direction installed cooling pipes 6 are installed in an orthogonal manner between the vertical-direction installed cooling pipes 4. Therefore, as illustrated in FIG. 9, when viewed from the air flow direction 8 during travel, the vertical-direction installed cooling pipes 4 and the traveling-direction installed cooling pipes 6 are alternately installed.

As illustrated in FIGS. 9 and 10, three vertical-direction installed cooling pipes 4 are installed in the same vertical plane, and sets of the three vertical-direction installed cooling pipes 4 are installed in seven rows in the horizontal direction. Further, on the inner side of the longest traveling-direction installed cooling pipe 6 among the traveling-direction installed cooling pipes 6 illustrated in FIG. 9, two traveling-direction installed cooling pipes 6, that is, the traveling-direction installed cooling pipe 6 having the shortest total length and the traveling-direction installed cooling pipe 6 having the second shortest total length illustrated in FIG. 11 are installed, and thus three traveling-direction installed cooling pipes 6 are installed on the same travel plane. Further, on the inner side of the medium-length traveling-direction installed cooling pipe 6 of FIG. 9, two traveling-direction installed cooling pipes 6, that is, the traveling-direction installed cooling pipe 6 having the shortest total length and the traveling-direction installed cooling pipe 6 having the second shortest total length illustrated in FIG. 11 are installed, and thus three traveling-direction installed cooling pipes 6 are installed on the same travel plane. Further, on the inner side of the shortest traveling-direction installed cooling pipe 6 of FIG. 9, two traveling-direction installed cooling pipes 6, that is, the traveling-direction installed cooling pipe 6 having the shortest total length and the traveling-direction installed cooling pipe 6 having the second shortest total length illustrated in FIG. 11 are installed, and thus three traveling-direction installed cooling pipes 6 are installed on the same travel plane. Therefore, in the cooling pipe group 16 of Embodiment 3, in total, twenty-one vertical-direction installed cooling pipes 4 and fifteen traveling-direction installed cooling pipes 6 are installed.

With the configuration of the cooling device according to Embodiment 3 of the present invention, the cooling device includes the traveling-direction installed cooling pipes 6, and thus has a larger surface area of the cooling pipe group 16 than that in the case where only the vertical-direction installed cooling pipes 4 are installed. Thus, the amount of heat exchange can be increased.

Further, the cooling device includes the traveling-direction installed cooling pipes 6 arranged in the same direction as the direction in which the traveling air flow moves. Thus, it is possible to suppress the outflow of the air flow, which has flowed into the installed cooling pipe region, toward the outer side in the direction perpendicular to the traveling direction of the air flow, thereby increasing the airflow rate flowing in the vehicle front direction. Therefore, there is produced an effect in that, without increasing the volume of the installed cooling pipe region, the amount of heat exchange from the cooling pipe group 16 can be increased.

Embodiment 4

Figure 12:
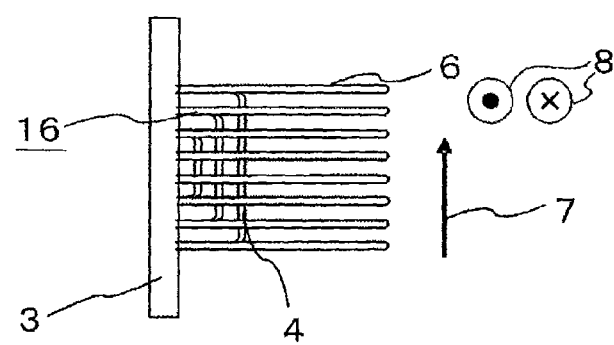
FIG. 12 is a projection view of a cooling device from the vehicle front direction according to Embodiment 4 of the present invention.
Figure 13:
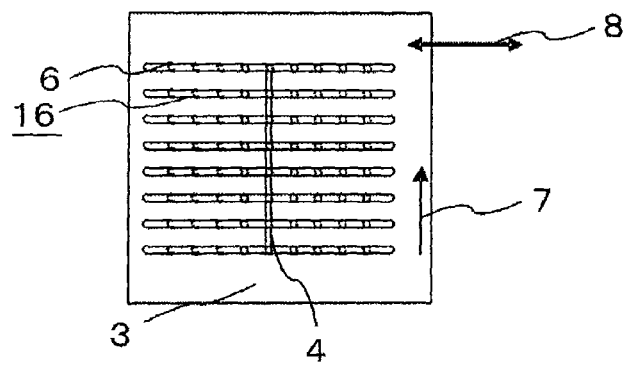
FIG. 13 is a projection view of the cooling device from the vehicle side direction according to Embodiment 4 of the present invention.
Figure 14:
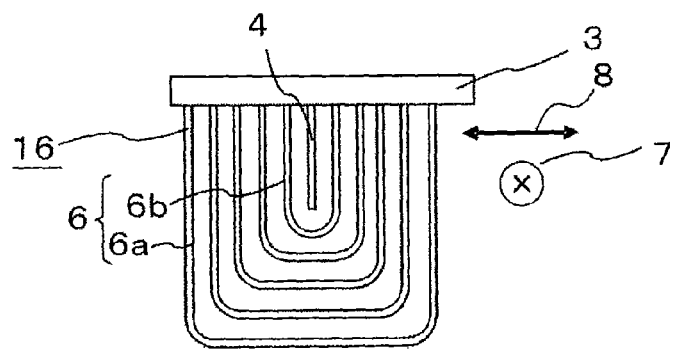
FIG. 14 is a projection view of the cooling device from the vehicle top direction according to Embodiment 4 of the present invention.

FIG. 12 is a projection view of a cooling device from the vehicle front direction according to Embodiment 4 of the present invention. FIG. 13 is a projection view of the cooling device from the vehicle side direction according to Embodiment 4 of the present invention. FIG. 14 is a projection view of the cooling device from the vehicle top direction according to Embodiment 4 of the present invention. The shapes of the cooling pipes 14 in Embodiment 4 are similar to those in Embodiment 1, but as illustrated in FIGS. 12 to 14, Embodiment 4 differs from Embodiment 1 in that the direction of the cooling pipe group 16 installed on the header 3 is turned by 90 degrees with respect to the traveling direction.

As illustrated in FIG. 12, on the header 3, the traveling-direction installed cooling pipes 6 are installed in the horizontal direction, and the vertical-direction installed cooling pipes 4 are installed in the vertical direction. Further, in order to increase the cooling efficiency of the cooling device, three vertical-direction installed cooling pipes 4 are installed in the empty space of the traveling-direction installed cooling pipe 6. In FIG. 12, the air flow direction 8 during travel is the direction from the front side to the deep side of the drawing sheet or the opposite direction thereto, and the air flow direction 7 during stop is a direction from the lower side to the upper side, that is, the vertical direction.

As illustrated in FIG. 13, on the header 3, the traveling-direction installed cooling pipes 6 are installed in the horizontal direction, and the vertical-direction installed cooling pipes 4 are installed in the vertical direction. In FIG. 13, the air flow direction 7 during stop is the direction from the lower side to the upper side, that is, the vertical direction, and the air flow direction 8 during travel is the horizontal direction.

In FIG. 14, the air flow direction 7 during stop is a direction from the deep side to the front side of the drawing sheet, and the air flow direction 8 during travel is the horizontal direction. As illustrated in FIG. 14, on the header 3, the traveling-direction installed cooling pipes 6 are installed on a plane perpendicular to the air flow direction 7 during stop, and the vertical-direction installed cooling pipes 4 are installed in the vertical direction. Note that, in FIG. 14, among the traveling-direction installed cooling pipes 6, an outer-peripheral traveling-direction installed cooling pipe 6a is the traveling-direction installed cooling pipe 6 positioned on the outermost side, and an inner-peripheral traveling-direction installed cooling pipe 6b is the traveling-direction installed cooling pipe 6 positioned on the innermost side.

Subsequently, with reference to FIGS. 12 to 14, the vertical-direction installed cooling pipes 4 and the traveling-direction installed cooling pipes 6, which construct the cooling pipe group 16 of Embodiment 4, are described. With reference to FIGS. 14 and 12, five traveling-direction installed cooling pipes 6 are arranged on the same travel plane, and sets of the five traveling-direction installed cooling pipes 6 are installed in eight rows in the vertical direction. Further, as illustrated in FIG. 12, three vertical-direction installed cooling pipes 4 are arranged in the empty space of the traveling-direction installed cooling pipe 6, and as illustrated in FIGS. 13 and 14, the three vertical-direction installed cooling pipes 4 are arranged on the same vertical plane. The cooling pipe group 16 of Embodiment 4 is obtained by turning the cooling pipe group 16 of Embodiment 1 by 90 degrees. Therefore, the number of the vertical-direction installed cooling pipes 4 and the number of the traveling-direction installed cooling pipes 6 are exchanged, and the cooling device includes, in total, three vertical-direction installed cooling pipes 4 and forty traveling-direction installed cooling pipes 6.

Figure 15:
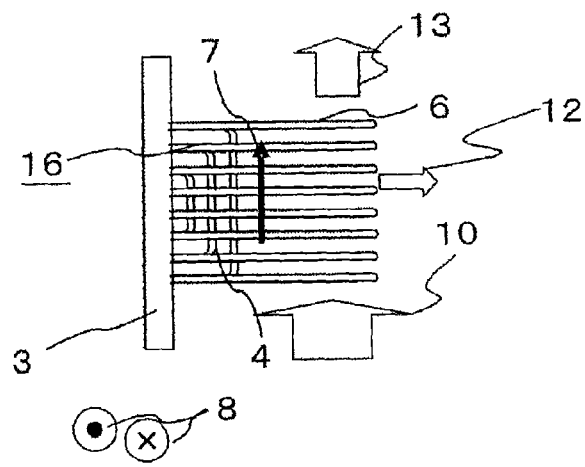
FIG. 15 is a projection view of the cooling device from the vehicle front direction according to Embodiment 4 of the present invention, which also illustrates the air flows that flow when the vehicle is stopped.

FIG. 15 is a view of the cooling device from the vehicle front direction according to Embodiment 4 of the present invention, which also illustrates air flows that flow when the vehicle is stopped. In FIG. 15, the air flow direction 8 during travel is the direction from the front side to the deep side of the drawing sheet or the opposite direction thereto, and the air flow direction 7 during stop is the direction from the lower side to the upper side, that is, the vertical direction.

The vertical-direction installed cooling pipes 4 and the traveling-direction installed cooling pipes 6 of FIG. 15 are arranged in the same direction and shape as the cooling pipes 14 of FIG. 12. The members and air flows of FIG. 15 are the same in terms of the direction as those in FIG. 12, but FIG. 15 further illustrates the air inflow rate 10, the air outflow rate 12, and the airflow rate 13 reaching the downstream side. When the vehicle is stropped, the air flow with the air inflow rate 10 flows through the cooling device to reach the downstream side with the airflow rate 13, but part of the air inflow rate 10 flows out in the middle as the air outflow rate 12 in a direction orthogonal to the air flow rising direction.

When the air flow with the air inflow rate 10 flows in the air flow direction 7 during stop, this air flow moves in the perpendicular direction to reach the downstream side with the airflow rate 13. However, when the air flow moves, the air flow moves also in the horizontal direction, which becomes the air outflow rate 12 to leak outside of the cooling pipe group 16.

The cooling device of FIG. 15 includes the vertical-direction installed cooling pipes 4, and hence as compared to the cooling pipe group 16 including only the traveling-direction installed cooling pipes 6, the surface area of the cooling pipe group 16 and the heat exchange amount are larger. Further, the vertical-direction installed cooling pipes 4 are installed in the same direction as the air flow direction 7 during stop, and thus it is possible to suppress the outflow of the rising air flow, which has flowed into the installed cooling pipe region, toward the outer side in the direction perpendicular to the rising air flow. Therefore, as compared to the case where the vertical-direction installed cooling pipe 4 is absent, the air outflow rate 12 is reduced, and the airflow rate 13 reaching the downstream side is increased. In the cooling pipe group 16 including only the traveling-direction installed cooling pipes 6 and the cooling pipe group 16 including the vertical-direction installed cooling pipes 4 in addition to the traveling-direction installed cooling pipes 6, the latter cooling pipe group 16 in which three vertical-direction installed cooling pipes 4 are added increases in the heat exchange amount by about 30%.

With the configuration of the cooling device according to Embodiment 4 of the present invention, the cooling device includes the vertical-direction installed cooling pipes 4, and thus has a larger surface area of the cooling pipe group 16 than that in the case where only the traveling-direction installed cooling pipes 6 are installed. Thus, the amount of heat exchange from the cooling pipe group 16 can be increased.

Further, the cooling pipe group 16 of Embodiment 4 of the present invention includes, in addition to the traveling-direction installed cooling pipes 6, the vertical-direction installed cooling pipes 4 in the same direction as the air flow direction during stop. Thus, it is possible to suppress the outflow of the air flow, which has flowed into the installed cooling pipe region, toward the outer side in the direction perpendicular to the rising direction of the air flow, and the airflow rate flowing through the cooling device increases. Therefore, it is possible to suppress the outflow of the vertical-direction air flow, which has flowed into the installed cooling pipe region, in the direction perpendicular to the vertical direction, and the airflow rate flowing in the vertical direction increases. Thus, there is produced an effect in that, without increasing the volume of the installed cooling pipe region, the amount of heat exchange from the cooling pipe group 16 can be increased.

Further, the vertical-direction installed cooling pipes 4 illustrated in FIG. 14 may be installed on the outer side of the outer-peripheral traveling-direction installed cooling pipe 6a. With the above-mentioned configuration, in FIG. 15, the vertical-direction installed cooling pipes 4 are positioned on the outer side with respect to the traveling-direction installed cooling pipes 6. The cooling pipe 14 positioned on the outermost side contributes to reduction in the air outflow rate 12, and hence the heat exchange amount can be further increased during stop.

Embodiment 5

Figure 16:
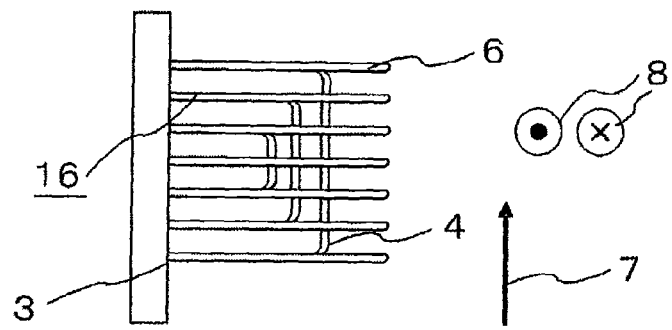
FIG. 16 is a projection view of a cooling device from the vehicle front direction according to Embodiment 5 of the present invention.
Figure 17:
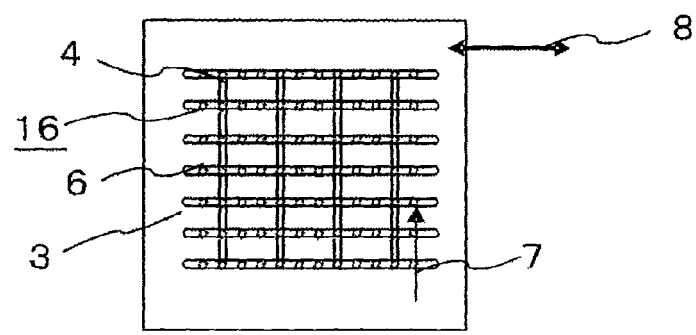
FIG. 17 is a projection view of the cooling device from the vehicle side direction according to Embodiment 5 of the present invention.
Figure 18:
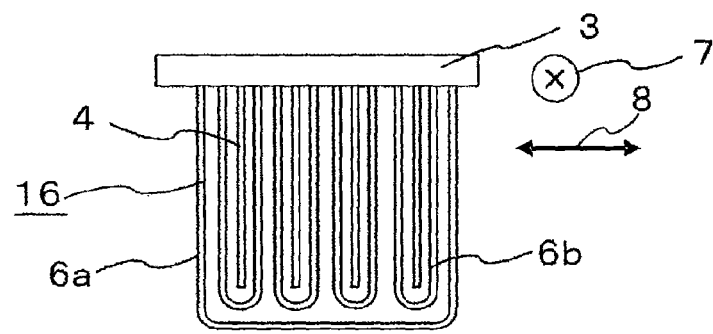
FIG. 18 is a projection view of the cooling device from the vehicle top direction according to Embodiment 5 of the present invention.

FIG. 16 is a projection view of a cooling device from the vehicle front direction according to Embodiment 5 of the present invention. FIG. 17 is a projection view of the cooling device from the vehicle side direction according to Embodiment 5 of the present invention. FIG. 18 is a projection view of the cooling device from the vehicle top direction according to Embodiment 5 of the present invention. The shapes of the cooling pipe group 16 in Embodiment 5 are similar to those in Embodiment 2, but as illustrated in FIGS. 16, 17, and 18, Embodiment 5 differs from Embodiment 2 in that the direction of the cooling pipe group 16 installed on the header 3 is turned by 90 degrees with respect to the traveling direction.

In Embodiment 5 of the present invention, as illustrated in FIG. 18, the outer-peripheral traveling-direction installed cooling pipe 6a is installed, and the inner-peripheral traveling-direction installed cooling pipes 6b and the vertical-direction installed cooling pipes 4 are mounted on the inner side thereof. Thus, the inner-peripheral traveling-direction installed cooling pipes 6b and the vertical-direction installed cooling pipes 4 are repeated in the traveling direction.

Subsequently, with reference to FIGS. 16 to 18, the configurations of the vertical-direction installed cooling pipes 4 and the traveling-direction installed cooling pipes 6, which construct the cooling pipe group 16 of Embodiment 5, are described. As illustrated in FIG. 18, in the cooling pipe group 16 of Embodiment 5, the vertical-direction installed cooling pipe 4 is installed on the inner periphery of the inner-peripheral traveling-direction installed cooling pipe 6b, and sets of the similar arrangement are installed in four rows in the traveling direction. Further, the outer-peripheral traveling-direction installed cooling pipe 6a and four inner-peripheral traveling-direction installed cooling pipes 6b are arranged on the same travel plane, and as illustrated in FIG. 17, sets of the outer-peripheral traveling-direction installed cooling pipe 6a and the four inner-peripheral traveling-direction installed cooling pipes 6b are installed in seven rows in the vertical direction. Further, in order to increase the cooling efficiency of the cooling pipe group 16, three vertical-direction installed cooling pipes 4 are installed on the same vertical plane in the empty space of the inner-peripheral traveling-direction installed cooling pipe 6b. Therefore, in the cooling pipe group 16 of Embodiment 5, in total, twelve vertical-direction installed cooling pipes 4 and thirty-five traveling-direction installed cooling pipes 6 are installed.

In FIG. 16, the air flow direction 8 during travel is the direction from the front side to the deep side of the drawing sheet or the opposite direction thereto, and the air flow direction 7 during stop is the direction from the lower side to the upper side, that is, the vertical direction. As illustrated in FIG. 16, on the header 3, the traveling-direction installed cooling pipes 6 are installed on the travel plane, and the vertical-direction installed cooling pipes 4 are installed on the vertical plane. Further, in order to increase the cooling efficiency of the cooling device, the twelve vertical-direction installed cooling pipes 4 are installed in the empty space of the traveling-direction installed cooling pipe 6.

In FIG. 17, the air flow direction 7 during stop is the direction from the lower side to the upper side, that is, the vertical direction, and the air flow direction 8 during travel is the horizontal direction. As illustrated in FIG. 17, on the header 3, the traveling-direction installed cooling pipes 6 are installed horizontally, and the vertical-direction installed cooling pipes 4 are installed vertically.

In FIG. 18, the air flow direction 7 during stop is the direction from the deep side to the front side of the drawing sheet, and the air flow direction 8 during travel is the horizontal direction. As illustrated in FIG. 18, on the header 3, the traveling-direction installed cooling pipes 6 are installed on the travel plane, and the vertical-direction installed cooling pipes 4 are installed vertically.

With the configuration of the cooling device according to Embodiment 5 of the present invention, the cooling device includes the vertical-direction installed cooling pipes 4, and thus the cooling pipe group 16 has a larger surface area than that in the case where only the traveling-direction installed cooling pipes 6 are installed. Thus, the amount of heat exchange from the cooling pipe group 16 can be increased.

Further, the shape and the dimension of the cooling pipe 14 are unified into five types, that is, three types of the vertical-direction installed cooling pipe 4 installed on the same vertical plane, the outer-peripheral traveling-direction installed cooling pipe 6a, and the inner-peripheral traveling-direction installed cooling pipe 6b. Therefore, the number of types of the shape of the cooling pipes 14 is reduced, which can improve the productivity.

Further, a single vertical-direction installed cooling pipe 4 may be arranged on the same travel plane instead of arranging a plurality of the vertical-direction installed cooling pipes 4 having different shapes. In addition, the traveling-direction installed cooling pipes 6 may be only the outer-peripheral traveling-direction installed cooling pipe 6a without arranging the inner-peripheral traveling-direction installed cooling pipes 6b. With such a configuration, the cooling pipe group 16 may include the cooling pipes 14 of only two types. The cooling pipes 14 are unified into the two types, and hence the number of types of the shape of the cooling pipes 14 can be further reduced, which can improve the productivity.

Further, in Embodiment 5 of the present invention, the cooling device includes the vertical-direction installed cooling pipes 4 in the same direction as the air flow direction during stop. Thus, it is possible to suppress the outflow of the air flow, which has flowed into the installed cooling pipe region, toward the outer side in the direction perpendicular to the direction of the air flow. Therefore, the airflow rate flowing through the cooling device is increased, and the heat exchange amount during stop can be increased.

Embodiment 6

Figure 19:
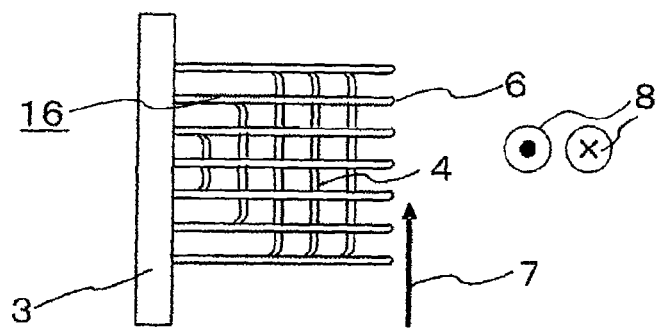
FIG. 19 is a projection view of a cooling device from the vehicle front direction according to Embodiment 6 of the present invention.
Figure 20:
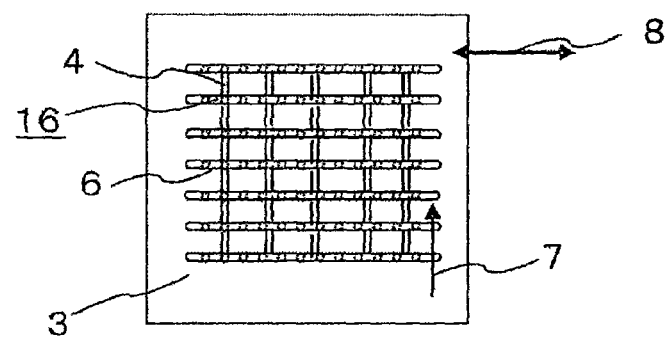
FIG. 20 is a projection view of the cooling device from the vehicle side direction according to Embodiment 6 of the present invention.
Figure 21:
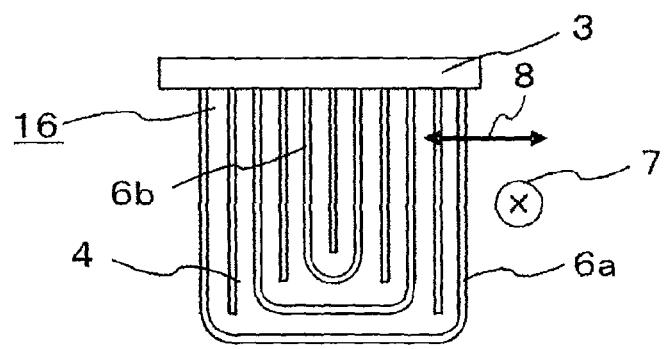
FIG. 21 is a projection view of the cooling device from the vehicle top direction according to Embodiment 6 of the present invention.

FIG. 19 is a projection view of a cooling device from the vehicle front direction according to Embodiment 6 of the present invention. FIG. 20 is a projection view of the cooling device from the vehicle side direction according to Embodiment 6 of the present invention. FIG. 21 is a projection view of the cooling device from the vehicle top direction according to Embodiment 6 of the present invention. The shapes of the cooling pipe group 16 in Embodiment 6 are similar to those in Embodiment 3, but as illustrated in FIGS. 19 to 21, Embodiment 6 differs from Embodiment 3 in that the direction of the cooling pipe group 16 installed on the header 3 is turned by 90 degrees with respect to the traveling direction.

As illustrated in FIG. 19, on the header 3, the traveling-direction installed cooling pipes 6 are installed on the travel plane, and the vertical-direction installed cooling pipes 4 are installed on the vertical plane. In FIG. 19, the air flow direction 8 during travel is the direction from the front side to the deep side of the drawing sheet or the opposite direction thereto, and the air flow direction 7 during stop is the direction from the lower side to the upper side, that is, the vertical direction.

In FIG. 20, the air flow direction 7 during stop is the direction from the lower side to the upper side, that is, the vertical direction, and the air flow direction 8 during travel is the horizontal direction. As illustrated in FIG. 20, on the header 3, the traveling-direction installed cooling pipes 6 are installed horizontally, and the vertical-direction installed cooling pipes 4 are installed on the vertical plane.

In FIG. 21, the air flow direction 7 during stop is the direction from the deep side to the front side of the drawing sheet, and the air flow direction 8 during travel is the horizontal direction. In Embodiment 6 of the present invention, as illustrated in FIG. 21, the outer-peripheral traveling-direction installed cooling pipe 6a is installed, and the vertical-direction installed cooling pipes 4 and the traveling-direction installed cooling pipes 6 are alternately installed on the inner side thereof.

Subsequently, with reference to FIGS. 19 to 21, the configurations of the vertical-direction installed cooling pipes 4 and the traveling-direction installed cooling pipes 6, which construct the cooling pipe group 16 of Embodiment 6, are described. The traveling-direction installed cooling pipes 6 installed on the same travel plane are installed in a nested shape in which each of the plurality of the travelling-direction installed cooling pipes 6 has a length larger than a length of another one, disposed on a more inner side, of the travelling-direction installed cooling pipes 6. Further, the vertical-direction installed cooling pipes 4 are installed in an orthogonal manner between the traveling-direction installed cooling pipes 6 in the nested shape. Therefore, as illustrated in FIG. 21, when viewed from the air flow direction 7 during stop, the traveling-direction installed cooling pipes 6 and the vertical-direction installed cooling pipes 4 are alternately installed.

As illustrated in FIGS. 19 and 20, three traveling-direction installed cooling pipes 6 illustrated in FIG. 21 are installed on the same travel plane, and sets of the three traveling-direction installed cooling pipes 6 are installed in seven rows in the vertical direction. Further, on the inner side of the longest vertical-direction installed cooling pipe 4 illustrated in FIG. 21, two vertical-direction installed cooling pipes 4, that is, the vertical-direction installed cooling pipe 4 having the shortest total length and the vertical-direction installed cooling pipe 4 having the second shortest total length illustrated in FIG. 19 are installed, and thus three vertical-direction installed cooling pipes 4 are installed on the same vertical plane. Further, on the inner side of the vertical-direction installed cooling pipe 4 having the medium length of FIG. 21, two vertical-direction installed cooling pipes 4, that is, the vertical-direction installed cooling pipe 4 having the shortest total length and the vertical-direction installed cooling pipe 4 having the second shortest total length illustrated in FIG. 19 are installed, and thus three vertical-direction installed cooling pipes 4 are installed on the same vertical plane. Further, on the inner side of the shortest vertical-direction installed cooling pipe 4 of FIG. 21, two vertical-direction installed cooling pipes 4, that is, the vertical-direction installed cooling pipe 4 having the shortest total length and the vertical-direction installed cooling pipe 4 having the second shortest total length illustrated in FIG. 19 are installed, and thus three vertical-direction installed cooling pipes 4 are installed on the same vertical plane. Therefore, in the cooling pipe group 16 of Embodiment 6, in total, twenty-one traveling-direction installed cooling pipes 6 and fifteen vertical-direction installed cooling pipes 4 are installed.

With the configuration of the cooling device according to Embodiment 6 of the present invention, the cooling device includes the vertical-direction installed cooling pipes 4, and thus has a larger surface area of the installed cooling pipes than that of the cooling pipe group 16 in which only the traveling-direction installed cooling pipes 6 are installed. Thus, the amount of heat exchange from the cooling pipe group 16 can be increased.

Further, the cooling pipe group 16 of Embodiment 6 of the present invention is the same in terms of the shape of the cooling pipe group 16 as the cooling pipe group 16 of Embodiment 3, but the direction of the cooling pipe group 16 installed on the header 3 is turned by 90 degrees. With this configuration, the cooling device includes the vertical-direction installed cooling pipes 4 installed in the same direction as the air flow during stop. Thus, it is possible to suppress the outflow of the air flow, which has flowed into the installed cooling pipe region, toward the outer side in the direction perpendicular to the direction of the air flow. Therefore, the airflow rate flowing through the cooling device is increased, and the heat exchange amount during stop can be increased.

Embodiment 7

Figure 22:
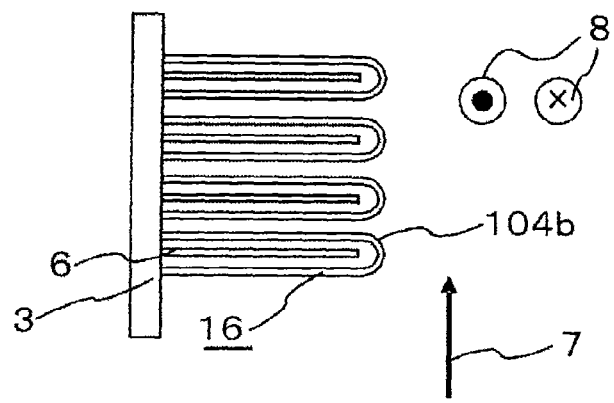
FIG. 22 is a projection view of a cooling device from the vehicle front direction according to Embodiment 7 of the present invention.
Figure 23:
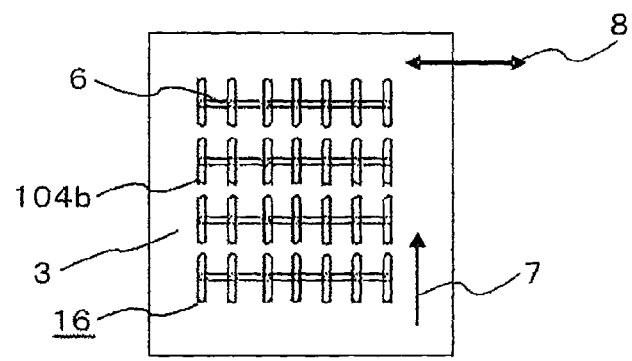
FIG. 23 is a projection view of the cooling device from the vehicle side direction according to Embodiment 7 of the present invention.
Figure 24:
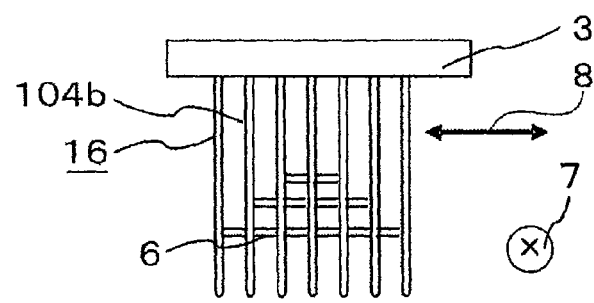
FIG. 24 is a projection view of the cooling device from the vehicle top direction according to Embodiment 7 of the present invention.

FIG. 22 is a projection view of a cooling device from the vehicle front direction according to Embodiment 7 of the present invention. FIG. 23 is a projection view of the cooling device from the vehicle side direction according to Embodiment 7 of the present invention. FIG. 24 is a projection view of the cooling device from the vehicle top direction according to Embodiment 7 of the present invention. The cooling pipe group 16 of Embodiment 7 is similar to that of Embodiment 2, but as illustrated in FIGS. 22 to 24, the cooling pipe group 16 of Embodiment 7 differs from that of Embodiment 2 in that the vertical-direction installed cooling pipe 4a is absent on the outermost side of the cooling pipe group 16.

In FIG. 22, the air flow direction 8 during travel is the direction from the front side to the deep side of the drawing sheet or the opposite direction thereto, and the air flow direction 7 during stop is the direction from the lower side to the upper side, that is, the vertical direction. In this embodiment, as illustrated in FIG. 22, vertical-direction installed cooling pipes 104b are installed, and the traveling-direction installed cooling pipes 6 are installed on the inner side thereof.

FIG. 23 is a projection view of the cooling device from the vehicle side direction according to Embodiment 7 of the present invention. In FIG. 23, the air flow direction 7 during stop is the direction from the lower side to the upper side, that is, the vertical direction, and the air flow direction 8 during travel is the horizontal direction. As illustrated in FIG. 23, on the header 3, the vertical-direction installed cooling pipes 104b are installed in the vertical direction, and the traveling-direction installed cooling pipes 6 are installed in the horizontal direction on the header 3.

FIG. 24 is a projection view of the cooling device from the vehicle top direction according to Embodiment 7 of the present invention. As illustrated in FIG. 24, on the header 3, the vertical-direction installed cooling pipes 104b are installed in the vertical direction, and the traveling-direction installed cooling pipes 6 are installed in the horizontal direction. In FIG. 24, the air flow direction 7 during stop is the direction from the deep side to the front side of the drawing sheet, and the air flow direction 8 during travel is horizontal.

Subsequently, with reference to FIGS. 22 to 24, the configurations of the vertical-direction installed cooling pipes 104b and the traveling-direction installed cooling pipes 6, which construct the cooling pipe group 16 of Embodiment 7, are described. The traveling-direction installed cooling pipe 6 is installed in the empty space positioned further on the inner side of the vertical-direction installed cooling pipe 104b. Four traveling-direction installed cooling pipes 6 are installed in the similar arrangement in the vertical direction. Further, as illustrated in FIGS. 22 and 23, four vertical-direction installed cooling pipes 104b are arranged on the same vertical plane, and sets of the four vertical-direction installed cooling pipes 104b are installed in seven rows in the traveling direction. Further, in order to increase the cooling efficiency of the cooling device, three traveling-direction installed cooling pipes 6 are installed on the same travel plane in the empty space of the vertical-direction installed cooling pipe 104b. Then, sets of the three traveling-direction installed cooling pipes 6 on the same travel plane are arranged in four rows in the vertical direction. Therefore, in total, twenty-eight vertical-direction installed cooling pipes 104b and twelve traveling-direction installed cooling pipes 6 are installed.

With the configuration of the cooling device according to Embodiment 7 of the present invention, the cooling device includes the traveling-direction installed cooling pipes 6, and thus has a larger surface area than that in the case where only the vertical-direction installed cooling pipes 104b are installed. Thus, there is produced an effect in that, without increasing the volume of the installed cooling pipe region, the amount of heat exchange from the cooling pipe group 16 can be increased.

Further, the shape and the dimension of the cooling pipes 14 are unified into four types, that is, three types of the traveling-direction installed cooling pipe 6 and the outer-peripheral vertical-direction installed cooling pipe 104b. Therefore, the number of types of the shape of the cooling pipes 14 is reduced, which can improve the productivity.

Further, in this embodiment, instead of arranging the plurality of the traveling-direction installed cooling pipes 6 having different shapes on the same travel plane, the cooling device may include the cooling pipes 14 of only two types, that is, the outer-peripheral vertical-direction installed cooling pipe 104b and one type of the traveling-direction installed cooling pipe 6. With such a configuration, the cooling pipes 14 are unified into two types, that is, the outer-peripheral vertical-direction installed cooling pipe 104b and the one type of the traveling-direction installed cooling pipe 6. Therefore, the number of types of the shape of the cooling pipes 14 can be further reduced, which can improve the productivity.

Embodiment 8

Figure 25:
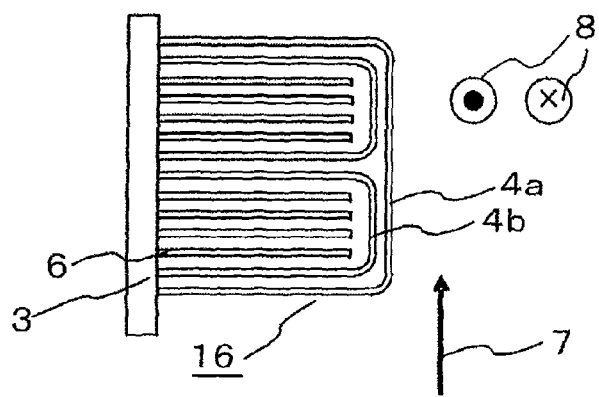
FIG. 25 is a projection view of a cooling device from the vehicle front direction according to Embodiment 8 of the present invention.
Figure 26:
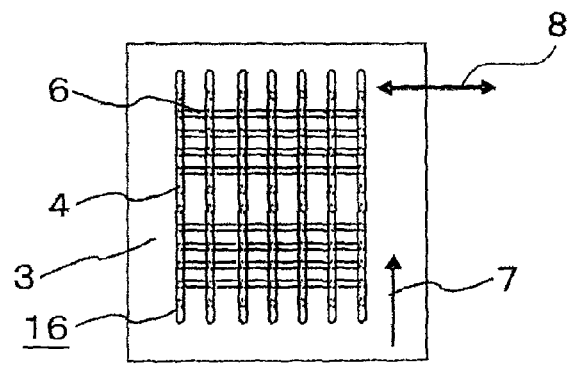
FIG. 26 is a projection view of the cooling device from the vehicle side direction according to Embodiment 8 of the present invention.
Figure 27:
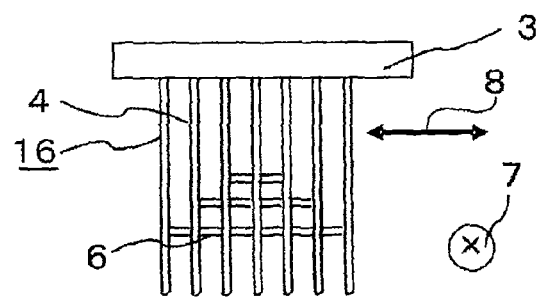
FIG. 27 is a projection view of the cooling device from the vehicle top direction according to Embodiment 8 of the present invention.

FIG. 25 is a projection view of a cooling device from the vehicle front direction according to Embodiment 8 of the present invention. FIG. 26 is a projection view of the cooling device from the vehicle side direction according to Embodiment 8 of the present invention. FIG. 27 is a projection view of the cooling device from the vehicle top direction according to Embodiment 8 of the present invention. The cooling pipe group 16 of Embodiment 8 is similar to that of Embodiment 2, but as illustrated in FIGS. 25 to 27, the cooling pipe group 16 in Embodiment 8 differs from that of Embodiment 2 in that the traveling-direction installed cooling pipes are installed in the vertical direction at a plurality of stages on the inner side of the vertical-direction installed cooling pipe.

In FIG. 25, the air flow direction 8 during travel is the direction from the front side to the deep side of the drawing sheet or the opposite direction thereto, and the air flow direction 7 during stop is the direction from the lower side to the upper side, that is, the vertical direction. In this embodiment, as illustrated in FIG. 25, the outer-peripheral vertical-direction installed cooling pipe 4a is installed, the inner-peripheral vertical-direction installed cooling pipes 4b are installed on the inner side thereof, and the traveling-direction installed cooling pipes 6 are mounted further on the inner side thereof.

FIG. 26 is a projection view of the cooling device from the vehicle side direction according to Embodiment 8 of the present invention. In FIG. 26, the air flow direction 7 during stop is the direction from the lower side to the upper side, that is, the vertical direction, and the air flow direction 8 during travel is the horizontal direction. As illustrated in FIG. 26, on the header 3, the vertical-direction installed cooling pipes 4 are installed in the vertical direction, and the traveling-direction installed cooling pipes 6 are installed in the horizontal direction.

FIG. 27 is a projection view of the cooling device from the vehicle top direction according to Embodiment 8 of the present invention. As illustrated in FIG. 27, on the header 3, the vertical-direction installed cooling pipes 4 are installed in the vertical direction, and the traveling-direction installed cooling pipes 6 are installed in the horizontal direction. In FIG. 27, the air flow direction 7 during stop is the direction from the deep side to the front side of the drawing sheet, and the air flow direction 8 during travel is the horizontal direction.

Subsequently, with reference to FIGS. 25 to 27, the configurations of the vertical-direction installed cooling pipes 4 and the traveling-direction installed cooling pipes 6, which construct the cooling pipe group 16 of Embodiment 8, are described. The traveling-direction installed cooling pipe 6 is installed in the empty space positioned further on the inner side of the inner-peripheral vertical-direction installed cooling pipe 4b. Two traveling-direction installed cooling pipes 6 are installed in the similar arrangement in the vertical direction. Further, as illustrated in FIGS. 25 and 26, the outer-peripheral vertical-direction installed cooling pipe 4a and two inner-peripheral vertical-direction installed cooling pipes 4b are arranged on the same vertical plane, and sets of the outer-peripheral vertical-direction installed cooling pipe 4a and the two inner-peripheral vertical-direction installed cooling pipes 4b are installed in seven rows in the traveling direction. Further, in order to increase the cooling efficiency of the cooling device, three traveling-direction installed cooling pipes 6 are installed on the same travel plane in the empty space of the vertical-direction installed cooling pipe 4b. Then, sets of the three traveling-direction installed cooling pipes 9 on the same travel plane are arranged in four rows in the vertical direction. Therefore, in total, twenty-one vertical-direction installed cooling pipes 4 and twenty-four traveling-direction installed cooling pipes 6 are installed.

With the configuration of the cooling device according to Embodiment 8 of the present invention, in this embodiment, the cooling device includes the traveling-direction installed cooling pipes 6, and thus has a larger surface area than that in the case where only the vertical-direction installed cooling pipes 4 are installed. Thus, there is produced an effect in that, without increasing the volume of the installed cooling pipe region, the amount of heat exchange from the cooling pipe group 16 can be increased.

Further, the cooling device includes the traveling-direction installed cooling pipes 6 arranged in the same direction as the air flow direction during travel. Thus, it is possible to suppress the outflow of the air flow, which has flowed into the installed cooling pipe region, toward the outer side in the direction perpendicular to the traveling direction of the air flow, thereby increasing the airflow rate flowing in the vehicle front direction. Therefore, the airflow rate flowing in the vehicle front direction increases, and thus there is produced an effect in that, without increasing the volume of the installed cooling pipe region, the amount of heat exchange from the cooling pipe group 16 can be increased.

Further, the shape and the dimension of the cooling pipes 14 are unified into the five types, that is, the three types of the traveling-direction installed cooling pipe 6, the outer-peripheral vertical-direction installed cooling pipe 4a, and the inner-peripheral vertical-direction installed cooling pipe 4b. Therefore, the number of types of the shape of the cooling pipes 14 is reduced, which can improve the productivity.

Further, in this embodiment, the vertical-direction installed cooling pipe includes a vertical linear part, and hence the vertical interval of the traveling-direction installed cooling pipes can be determined independent of the bending limit of the pipe. In Embodiment 2, the vertical distance between the vertical-direction installed cooling pipe and the traveling-direction installed cooling pipe is 40 mm, which is wider by about 10 mm than other intervals of the cooling pipes. In contrast, in this embodiment, the cooling pipe interval can be narrowed by 10 mm at eight positions as compared to Embodiment 2, and thus the vertical range of the cooling pipe group can be reduced by 80 mm.

Therefore, in this embodiment, the pipes can be installed at a high density. In a space of 80 mm, the traveling-direction installed cooling pipes can be installed at about two stages. Therefore, there is produced an effect in that, without increasing the vertical distance of the cooling pipe region, the amount of heat exchange from the cooling pipe group 16 can be increased.

Embodiment 9

Figure 28:
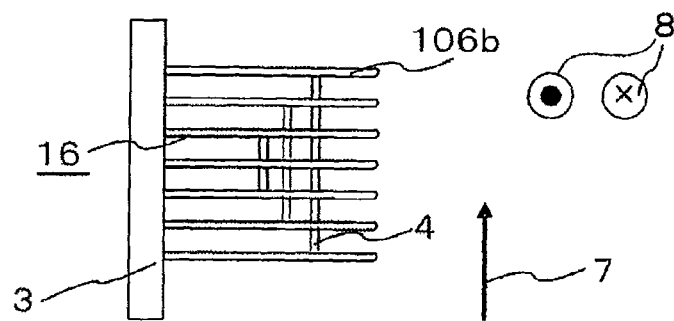
FIG. 28 is a projection view of a cooling device from the vehicle front direction according to Embodiment 9 of the present invention.
Figure 29:
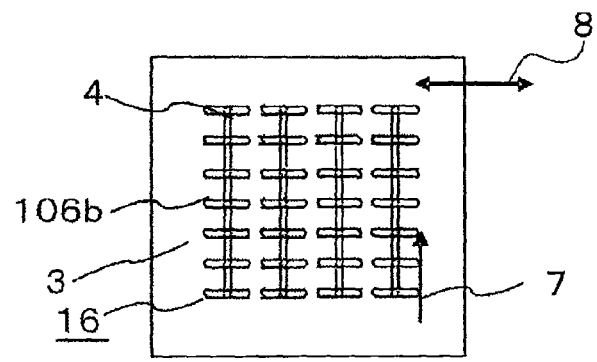
FIG. 29 is a projection view of the cooling device from the vehicle side direction according to Embodiment 9 of the present invention.
Figure 30:
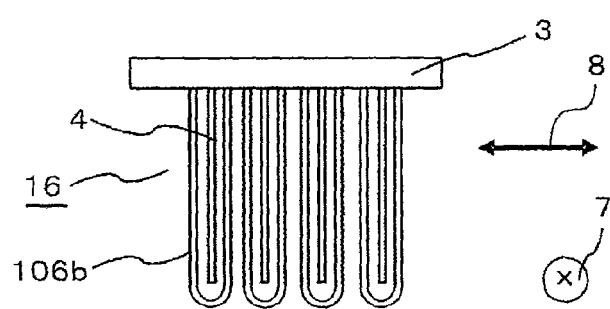
FIG. 30 is a projection view of the cooling device from the vehicle top direction according to Embodiment 9 of the present invention.

FIG. 28 is a projection view of a cooling device from the vehicle front direction according to Embodiment 9 of the present invention. FIG. 29 is a projection view of the cooling device from the vehicle side direction according to Embodiment 9 of the present invention. FIG. 30 is a projection view of the cooling device from the vehicle top direction according to Embodiment 9 of the present invention. The cooling pipe group 16 of Embodiment 5 is similar to that of Embodiment 5, but as illustrated in FIGS. 28, 29, and 30, the cooling pipe group 16 of Embodiment 9 differs from that of Embodiment 5 in that the outermost traveling-direction installed cooling pipe is absent.

In Embodiment 9 of the present invention, as illustrated in FIG. 30, the outer-peripheral traveling-direction installed cooling pipes 106b are installed, and the vertical-direction installed cooling pipes 4 are mounted on the inner side thereof, so that the inner-peripheral traveling-direction installed cooling pipes 106b and the vertical-direction installed cooling pipes 4 are repeated in the traveling direction.

Subsequently, with reference to FIGS. 28 to 30, the configurations of the vertical-direction installed cooling pipes 4 and the traveling-direction installed cooling pipes 106b, which construct the cooling pipe group 16 of Embodiment 9, are described. As illustrated in FIG. 30, in the cooling pipe group 16 of Embodiment 9, the vertical-direction installed cooling pipe 4 is installed on the inner periphery of the traveling-direction installed cooling pipe 106b, and sets of the similar arrangement are installed in four rows in the traveling direction. Further, the four inner-peripheral traveling-direction installed cooling pipes 106b are arranged on the same travel plane, and as illustrated in FIG. 29, sets of the four inner-peripheral traveling-direction installed cooling pipes 106b are installed in seven rows in the vertical direction. Further, in order to increase the cooling efficiency of the cooling pipe group 16, the three vertical-direction installed cooling pipes 4 are installed on the same vertical plane in the empty space of the traveling-direction installed cooling pipe 106b. Therefore, in the cooling pipe group 16 of Embodiment 5, in total, twelve vertical-direction installed cooling pipes 4 and twenty-eight traveling-direction installed cooling pipes 106b are installed.

In FIG. 28, the air flow direction 8 during travel is the direction from the front side to the deep side of the drawing sheet or the opposite direction thereto, and the air flow direction 7 during stop is the direction from the lower side to the upper side, that is, the vertical direction. As illustrated in FIG. 28, on the header 3, the traveling-direction installed cooling pipes 106b are installed on the travel plane, and the vertical-direction installed cooling pipes 4 are installed on the vertical plane. Further, in order to increase the cooling efficiency of the cooling device, the twelve vertical-direction installed cooling pipes 4 are installed in the empty space of the traveling-direction installed cooling pipe 106b.

In FIG. 29, the air flow direction 7 during stop is the direction from the lower side to the upper side, that is, the vertical direction, and the air flow direction 8 during travel is the horizontal direction. As illustrated in FIG. 29, on the header 3, the traveling-direction installed cooling pipes 106b are installed horizontally, and the vertical-direction installed cooling pipes 4 are installed vertically.

In FIG. 30, the air flow direction 7 during stop is a direction from the deep side to the front side of the drawing sheet, and the air flow direction 8 during travel is the horizontal direction. As illustrated in FIG. 30, on the header 3, the traveling-direction installed cooling pipes 106b are installed on the travel plane, and the vertical-direction installed cooling pipes 4 are installed on the vertical plane.

With the configuration of the cooling device according to Embodiment 9 of the present invention, the cooling device includes the vertical-direction installed cooling pipes 4, and thus the cooling pipe group 16 has a larger surface area than that in the case where only the traveling-direction installed cooling pipes 106b are installed. Thus, the amount of heat exchange from the cooling pipe group 16 can be increased.

Further, the shape and the dimension of the cooling pipe 14 are unified into four types, that is, the three types of the vertical-direction installed cooling pipe 4 installed on the same vertical plane and the outer-peripheral traveling-direction installed cooling pipe 106b. Therefore, the number of types of the shape of the cooling pipes 14 is reduced, which can improve the productivity.

Further, one type of the vertical-direction installed cooling pipe 4 may be arranged on the same travel plane instead of arranging the plurality of the vertical-direction installed cooling pipes 4 having different shapes. With such a configuration, the cooling pipe group 16 may include the cooling pipes 14 of only the two types. The cooling pipes 14 are unified into the two types, and hence the number of types of the shape of the cooling pipes 14 can be further reduced, which can improve the productivity.

Embodiment 10

Figure 31:
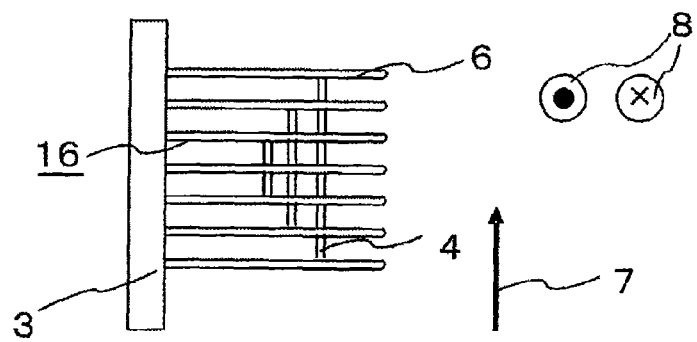
FIG. 31 is a projection view of a cooling device from the vehicle front direction according to Embodiment 10 of the present invention.
Figure 32:
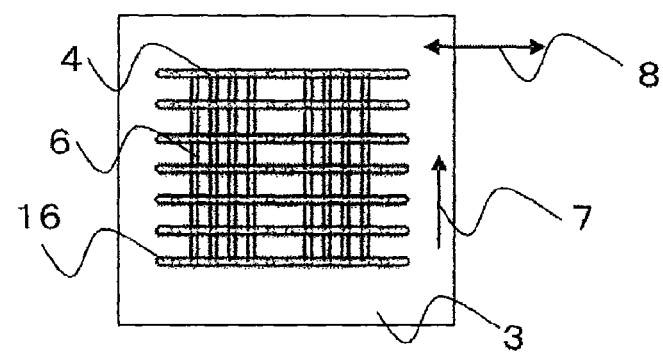
FIG. 32 is a projection view of the cooling device from the vehicle side direction according to Embodiment 10 of the present invention.
Figure 33:
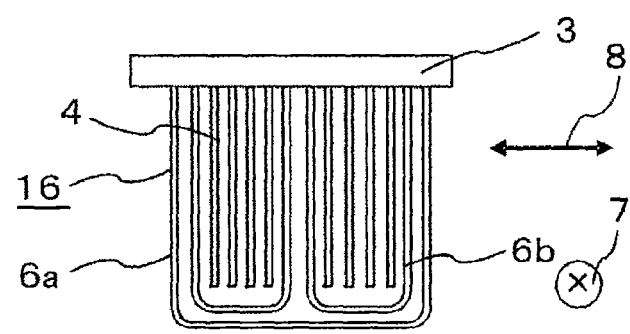
FIG. 33 is a projection view of the cooling device from the vehicle top direction according to Embodiment 10 of the present invention.

FIG. 31 is a projection view of a cooling device from the vehicle front direction according to Embodiment 10 of the present invention. FIG. 32 is a projection view of the cooling device from the vehicle side direction according to Embodiment 10 of the present invention. FIG. 33 is a projection view of the cooling device from the vehicle top direction according to Embodiment 10 of the present invention. The cooling pipe group 16 of Embodiment 10 is similar to that of Embodiment 5, but as illustrated in FIGS. 31 to 33, the cooling pipe group 16 of Embodiment 10 differs from that of Embodiment 5 in that the vertical-direction installed cooling pipes 4 are installed in the traveling direction at a plurality of stages on the inner side of the traveling-direction installed cooling pipes 6.

In Embodiment 10 of the present invention, as illustrated in FIG. 33, the outer-peripheral traveling-direction installed cooling pipe 6a is installed, and the inner-peripheral traveling-direction installed cooling pipes 6b and the vertical-direction installed cooling pipes 4 are mounted on the inner side thereof, so that the inner-peripheral traveling-direction installed cooling pipes 6b and the vertical-direction installed cooling pipes 4 are repeated in the traveling direction.

Subsequently, with reference to FIGS. 31 to 33, the configurations of the vertical-direction installed cooling pipes 4 and the traveling-direction installed cooling pipes 6, which construct the cooling pipe group 16 of Embodiment 10, are described. As illustrated in FIG. 33, in the cooling pipe group 16 of Embodiment 10, the vertical-direction installed cooling pipes 4 are installed on the inner periphery of the inner-peripheral traveling-direction installed cooling pipe 6b, and sets of the similar arrangement are installed in four rows in the traveling direction. Further, the outer-peripheral traveling-direction installed cooling pipe 6a and four inner-peripheral traveling-direction installed cooling pipes 6b are arranged on the same travel plane, and as illustrated in FIG. 33, sets of the outer-peripheral traveling-direction installed cooling pipe 6a and the four inner-peripheral traveling-direction installed cooling pipes 6b are installed in seven rows in the vertical direction. Further, in order to increase the cooling efficiency of the cooling pipe group 16, the three vertical-direction installed cooling pipes 4 are installed on the same vertical plane in the empty space of the inner-peripheral traveling-direction installed cooling pipe 6b. Therefore, in the cooling pipe group 16 of Embodiment 10, in total, twenty-four vertical-direction installed cooling pipes 4 and twenty-one traveling-direction installed cooling pipes 6 are installed.

In FIG. 31, the air flow direction 8 during travel is the direction from the front side to the deep side of the drawing sheet or the opposite direction thereto, and the air flow direction 7 during stop is the direction from the lower side to the upper side, that is, the vertical direction. As illustrated in FIG. 31, on the header 3, the traveling-direction installed cooling pipes 6 are installed on the travel plane, and the vertical-direction installed cooling pipes 4 are installed on the vertical plane. Further, in order to increase the cooling efficiency of the cooling device, the twelve vertical-direction installed cooling pipes 4 are installed in the empty space of the traveling-direction installed cooling pipe 6.

In FIG. 32, the air flow direction 7 during stop is the direction from the lower side to the upper side, that is, the vertical direction, and the air flow direction 8 during travel is the horizontal direction. As illustrated in FIG. 32, on the header 3, the traveling-direction installed cooling pipes 6 are installed horizontally, and the vertical-direction installed cooling pipes 4 are installed vertically.

In FIG. 33, the air flow direction 7 during stop is the direction from the deep side to the front side of the drawing sheet, and the air flow direction 8 during travel is the horizontal direction. As illustrated in FIG. 33, on the header 3, the traveling-direction installed cooling pipes 6 are installed on the travel plane, and the vertical-direction installed cooling pipes 4 are installed vertically.

With the configuration of the cooling device according to Embodiment 10 of the present invention, the cooling device includes the vertical-direction installed cooling pipes 4, and thus the cooling pipe group 16 has a larger surface area than that in the case where only the traveling-direction installed cooling pipes 6 are installed. Thus, the amount of heat exchange from the cooling pipe group 16 can be increased.

Further, the shape and the dimension of the cooling pipe 14 are unified into the five types, that is, the three types of the vertical-direction installed cooling pipe 4 installed on the same vertical plane, the outer-peripheral traveling-direction installed cooling pipe 6a, and the inner-peripheral traveling-direction installed cooling pipe 6b. Therefore, the number of types of the shape of the cooling pipes 14 is reduced, which can improve the productivity.

Further, the single vertical-direction installed cooling pipe 4 may be arranged on the same travel plane instead of arranging the plurality of the vertical-direction installed cooling pipes 4 having different shapes. In addition, the traveling-direction installed cooling pipes 6 may be only the outer-peripheral traveling-direction installed cooling pipe 6a without arranging the inner-peripheral traveling-direction installed cooling pipes 6b. With such a configuration, the cooling pipe group 16 may include the cooling pipes 14 of only the two types. The cooling pipes 14 are unified into the two types, and hence the number of types of the shape of the cooling pipes 14 is further reduced, which can improve the productivity.

Further, in Embodiment 10 of the present invention, the cooling device includes the vertical-direction installed cooling pipes 4 in the same direction as the air flow direction during stop. Thus, it is possible to suppress the outflow of the air flow, which has flowed into the installed cooling pipe region, toward the outer side in the direction perpendicular to the direction of the air flow. Therefore, the airflow rate flowing through the cooling device is increased, and the heat exchange amount during stop can be increased.

Further, in this embodiment, the traveling-direction installed cooling pipe includes the vertical linear part 14c, and hence the traveling-direction interval of the vertical-direction installed cooling pipes can be determined independent of the bending limit of the pipe. In Embodiment 5, the traveling-direction distance between the traveling-direction installed pipe and the vertical-direction installed cooling pipe is 40 mm, which is wider by about 10 mm than other intervals of the cooling pipes. In contrast, in this embodiment, the cooling pipe interval can be narrowed by 10 mm at eight positions as compared to Embodiment 5, and thus the traveling-direction range of the cooling pipe group can be reduced by 80 mm. Therefore, the pipes can be installed at a high density.

Therefore, in this embodiment, in a space of 80 mm, the vertical-direction installed cooling pipes can be installed at about two stages. Therefore, there is produced an effect in that, without increasing the traveling-direction distance of the cooling pipe region, the amount of heat exchange from the cooling pipe group 16 can be increased.

REFERENCE SIGNS LIST 1 transformer 3 header 4 vertical-direction installed cooling pipe 6 traveling-direction installed cooling pipe

The invention claimed is:

1. An in-vehicle cooling device, comprising:
  a header to be mounted so as to be adjacent to a side surface of a transformer mounted on a back side of a bottom portion of the vehicle, the header having a surface extending along a traveling direction that is a horizontal direction along which air flows during traveling of the vehicle and a direction orthogonal to the travelling direction;

a vertical-direction installed cooling pipe having
   both ends each fixed to the header at different heights of positions of the header in a vertical direction, and
   a part between the both ends of the vertical-direction installed cooling pipe that is orthogonal to the traveling direction, the vertical-direction installed cooling pipe being installed on a vertical plane in the vertical direction that is a direction along which the air flows from a lower side to an upper side during a stop of the vehicle; and a traveling-direction installed cooling pipe having
   both ends each fixed to the header at different positions in the traveling direction, and
   a part between the both ends of the traveling-direction installed cooling pipe that is installed on a travel plane parallel to a horizontal plane, the vertical-direction installed cooling pipe and the traveling-direction installed cooling pipe being installed to overlap with each other in a direction orthogonal to the header, the traveling-direction installed cooling pipe having a part that is not hidden by the vertical-direction installed cooling pipe when viewed from above in the vertical direction, and an opening in the header corresponding to the traveling-direction installed cooling pipe is aligned with an opening in the header corresponding to the vertical-direction installed cooling pipe in the vertical plane.

2. The in-vehicle cooling device of claim 1,
wherein the vertical-direction installed cooling pipe and the traveling-direction installed cooling pipe form a cooling pipe group, and
wherein the traveling-direction installed cooling pipe is installed on an outermost side of the cooling pipe group.

3. The in-vehicle cooling device of claim 1,
wherein the vertical-direction installed cooling pipe and the traveling-direction installed cooling pipe form a cooling pipe group, and
wherein the vertical-direction installed cooling pipe is installed on an outermost side of the cooling pipe group.

4. The in-vehicle cooling device of claim 1,
wherein the traveling-direction installed cooling pipe includes a plurality of the traveling-direction installed cooling pipes or the vertical-direction installed cooling pipe includes a plurality of the vertical-direction installed cooling pipes, and
wherein the plurality of the traveling-direction installed cooling pipes or the plurality of the vertical-direction installed cooling pipes have a same shape.

5. The in-vehicle cooling device of claim 1, wherein at least one of the traveling-direction installed cooling pipe and the vertical-direction installed cooling pipe comprises a linear part.

6. The in-vehicle cooling device of claim 1,
wherein a plurality of the traveling-direction installed cooling pipes are arranged on the same travel plane,
wherein, on an inner side of the traveling-direction installed cooling pipe having a shortest total length among the traveling-direction installed cooling pipes present on the same travel plane, the vertical-direction installed cooling pipe is installed in one or more rows.

7. The in-vehicle cooling device of claim 1,
wherein a plurality of the vertical-direction installed cooling pipes are arranged on the same vertical plane,
wherein, on an inner side of the vertical-direction installed cooling pipe having a shortest total length among the vertical-direction installed cooling pipes present on the same vertical plane, the traveling-direction installed cooling pipe is installed in one or more rows.

8. The in-vehicle cooling device of claim 1,
wherein a plurality of the traveling-direction installed cooling pipes are arranged on the same travel plane,
wherein the plurality of the traveling-direction installed cooling pipes are arranged in a nested shape in which each of the plurality of the travelling-direction installed cooling pipes has a length larger than a length of another one, disposed on a more inner side, of the travelling-direction installed cooling pipes, and
wherein the vertical-direction installed cooling pipe is installed in an orthogonal manner between the plurality of the traveling-direction installed cooling pipes in the nested shape.

9. The in-vehicle cooling device of claim 1,
wherein a plurality of the vertical-direction installed cooling pipes are arranged on the same vertical plane,
wherein the plurality of the vertical-direction installed cooling pipes are arranged in a nested shape in which each of the plurality of the vertical-direction cooling pipes has a length larger than, a length of another one, disposed on a more inner side, of the vertical-direction cooling pipes, and
wherein the traveling-direction installed cooling pipe is installed in an orthogonal manner between the plurality of the vertical-direction installed cooling pipes in the nested shape.

* * * * *